United States Patent
Larikova et al.

(10) Patent No.: US 10,972,207 B2
(45) Date of Patent: Apr. 6, 2021

(54) METHOD AND APPARATUS FOR MODULAR ROADM AND REMOTE DWDM WAVELENGTH ADD/DROP

(71) Applicant: Coriant Operations, Inc., Naperville, IL (US)

(72) Inventors: Julia Y. Larikova, Naperville, IL (US); Yajun Wang, Naperville, IL (US); Bradley Ronald Kangas, Saint Charles, IL (US); Larry J. DeeWaard, II, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

(21) Appl. No.: 15/047,363

(22) Filed: Feb. 18, 2016

(65) Prior Publication Data
US 2016/0248535 A1    Aug. 25, 2016

Related U.S. Application Data
(60) Provisional application No. 62/118,393, filed on Feb. 19, 2015.

(51) Int. Cl.
H04J 14/02     (2006.01)
H04B 10/80    (2013.01)

(52) U.S. Cl.
CPC ........ H04J 14/0212 (2013.01); H04B 10/801 (2013.01)

(58) Field of Classification Search
CPC ................................................. H04B 10/801
See application file for complete search history.

(56) References Cited

U.S. PATENT DOCUMENTS 5,923,451 A * 7/1999 Karstensen ............ G02B 6/43
                                                  398/135
6,344,911 B1   2/2002 Dailey, Jr. et al.
(Continued)

FOREIGN PATENT DOCUMENTS

WO    WO 03/036341 A2    5/2003
WO    WO 03/103187 A1    12/2003

OTHER PUBLICATIONS

"Function." The American Heritage(R) Dictionary of the English Language, edited by Editors of the American Heritage Dictionaries, Houghton Mifflin, 6th edition, 2016. Credo Reference, https://search.credoreference.com/content/entry/hmdictenglang/function/0?institutionId=743. Accessed May 21, 2018.*

(Continued)

Primary Examiner — Tanya T Motsinger

(57) ABSTRACT

Example embodiments are in a form of a system, corresponding electronics card (or apparatus), or corresponding method. Some embodiments include a multi-channel optical layer system. According to some embodiments, the system may include a network interface layer, an adapter layer, and an optical function layer. The adapter layer may learn functions and/or corresponding specifications from the function layer. The adapter layer may configure the adapter layer itself to interoperate between the network interface layer and the optical function layer. The adapter layer may provide flexibility in the size of configured functionality. The adapter layer may reduce cost of configuration (or reconfiguration) because functions may be discretized. New markets may be reached because of this reduced cost, as well as due to smaller size configurations (of hardware and software), reduced electronics, reduced power, and improved thermal cooling requirements for lesser-developed network configurations.

9 Claims, 20 Drawing Sheets

(56) References Cited

U.S. PATENT DOCUMENTS

| | | | |
|---|---|---|---|
| 6,556,340 B1 | 4/2003 | Wysocki et al. | |
| 6,915,036 B2 | 7/2005 | Bhalla et al. | |
| 7,729,617 B2* | 6/2010 | Sheth | H04B 10/801 |
| | | | 398/135 |
| 8,155,519 B2 | 4/2012 | Sheth et al. | |
| 10,063,336 B1* | 8/2018 | Moynihan | H04L 41/0659 |
| 10,411,796 B1* | 9/2019 | Archambault | H04B 10/077 |
| 2003/0231624 A1* | 12/2003 | Alappat | H04L 49/405 |
| | | | 370/360 |
| 2004/0003132 A1* | 1/2004 | Stanley | G06F 16/20 |
| | | | 719/316 |
| 2005/0108414 A1* | 5/2005 | Taylor | H04L 29/06027 |
| | | | 709/231 |
| 2006/0277346 A1* | 12/2006 | Doak | H04L 12/5692 |
| | | | 710/305 |
| 2006/0282543 A1* | 12/2006 | Bowater | H04L 65/608 |
| | | | 709/231 |
| 2008/0052380 A1* | 2/2008 | Morita | G06F 16/48 |
| | | | 709/219 |
| 2008/0074732 A1* | 3/2008 | Stephens | H04B 10/2933 |
| | | | 359/334 |
| 2009/0116845 A1* | 5/2009 | Li | H04B 10/077 |
| | | | 398/135 |
| 2010/0052780 A1* | 3/2010 | Summerfield | H03F 1/3247 |
| | | | 330/149 |
| 2012/0224851 A1* | 9/2012 | Takara | H04J 14/0221 |
| | | | 398/45 |
| 2013/0108215 A1* | 5/2013 | Ticknor | H04J 14/0212 |
| | | | 385/17 |
| 2014/0056593 A1* | 2/2014 | DeAndrea | H04B 10/40 |
| | | | 398/135 |
| 2014/0233060 A1* | 8/2014 | Anezaki | H04N 1/00188 |
| | | | 358/1.15 |
| 2014/0376918 A1* | 12/2014 | Boduch | H04L 25/03006 |
| | | | 398/83 |
| 2015/0086203 A1* | 3/2015 | Boduch | H04B 10/2941 |
| | | | 398/50 |
| 2015/0186798 A1* | 7/2015 | Vasseur | G06Q 10/06375 |
| | | | 706/12 |
| 2016/0315701 A1* | 10/2016 | Yuki | H04B 10/0773 |
| 2016/0365921 A1* | 12/2016 | Costantini | H04B 10/07955 |
| 2018/0270009 A1* | 9/2018 | Mansouri Rad | |
| | | | H04B 10/07953 |

OTHER PUBLICATIONS

"Tellabs 7100 Roadmap Discussion," 77 pages, Jun. 19, 2013 (redacted pages available to Examiner upon request).

"Tellabs 7100 mTera," 97 pages, Aug. 27, 2013 (redacted pages available to Examiner upon request).

* cited by examiner

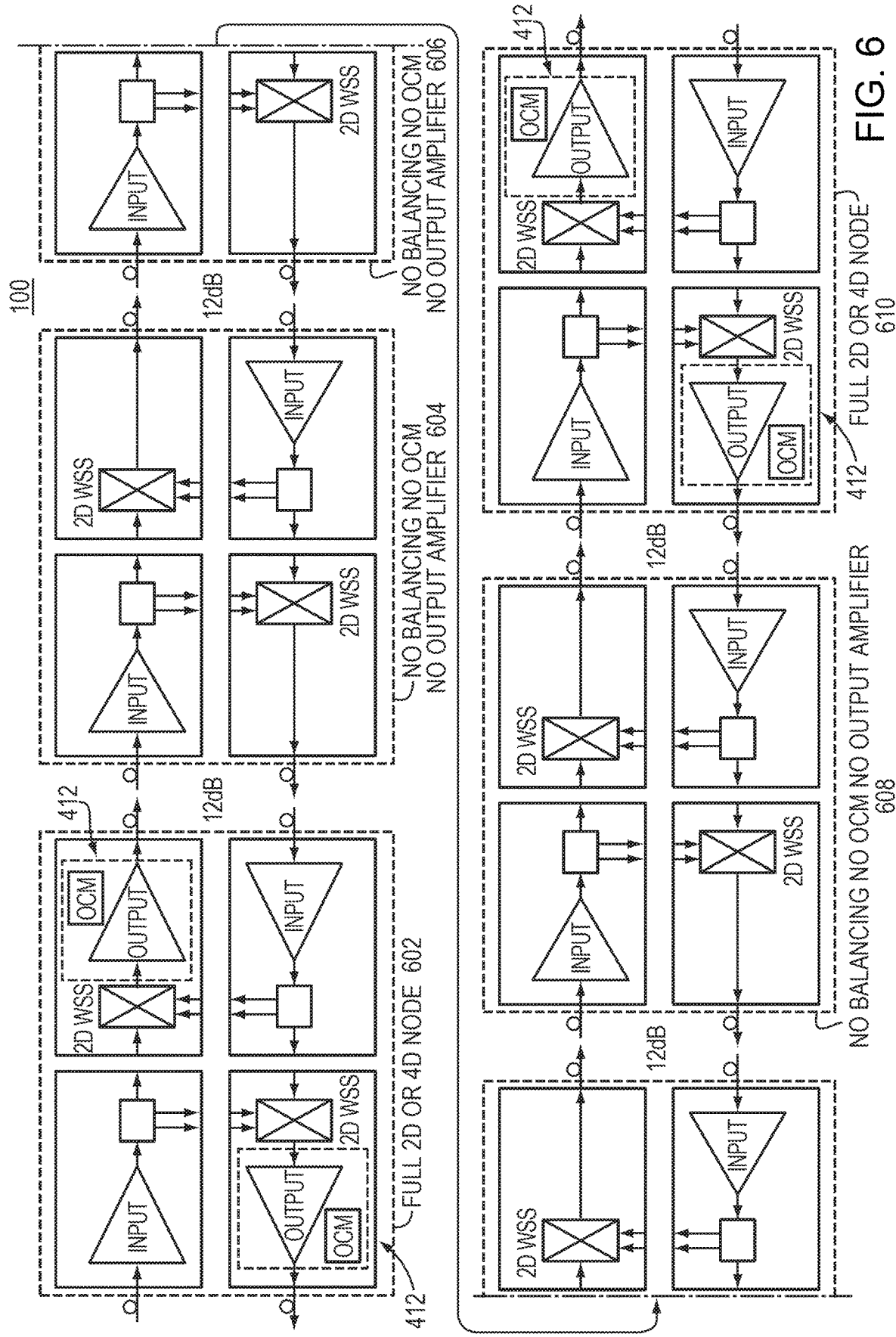

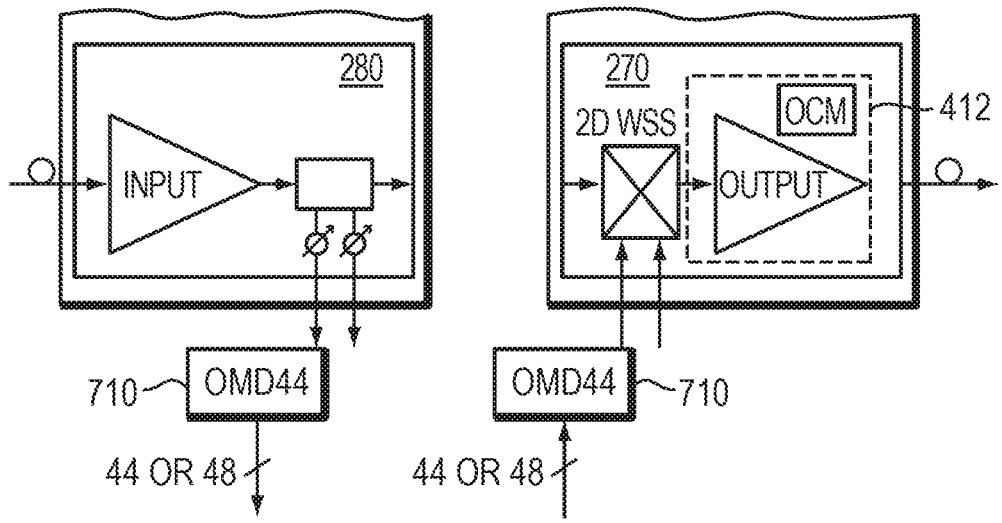
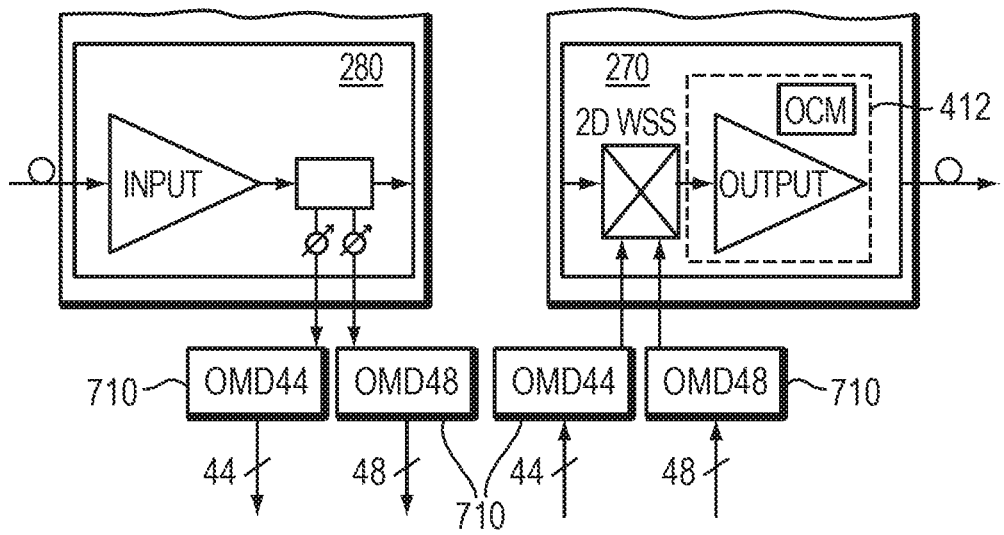
FIG. 7

METHOD AND APPARATUS FOR MODULAR ROADM AND REMOTE DWDM WAVELENGTH ADD/DROP

RELATED APPLICATION

This application claims the benefit of U.S. Provisional Application No. 62/118,393, filed on Feb. 19, 2015. The entire teachings of the above application are incorporated herein by reference.

BACKGROUND

An optical communications network may allow a large group of widely-distributed users to inter-communicate with each other. An optical network may comprise of a variety of devices, which may be connected together through a variety of media types that may operate in conjunction to form connections between network users.

Generally, a user may receive and/or transmit data using a wired and/or wireless medium. The data from various users may then be aggregated and transported through optical network and/or other methods of optical communications. An optical network may comprise various nodes, including, but not limited to, optical add/drop multiplexers (OADMs). The OADMs may receive traffic from the network and may select wavelengths to be demultiplexed and/or dropped. Relevant data in selected wavelengths may be forwarded to local users. In the other direction, data from local users may be optically transported through selected wavelengths, and selected wavelengths may be multiplexed onto the optical network.

At least two types of nodes may be used in optical networking. The first type of node may allow for a card (e.g., line card) on a shelf to concentrate on a given task. For example, for an existing OADM node, one card may have optical supervisory channel (OSC) functionality, another card may have wavelength selective switches (WSS), another card may have pre-amplifiers, another card may have boosters, another card may have optical channel monitor (OCM) functionality, and yet another card may have other functionality. Such an architecture may provide flexibility, since cards may be added and/or removed to configure the node as desired.

The second type of node may use a card that has various different functionalities built in. For example, an OADM card may have functionality including one or more of OSC, WSS, pre-amplifiers, boosters, OCM, and/or other functionality. While this type of equipment may provide OADM functionality at a reduced cost, a drawback exists in that the node configuration is not as flexible as the first type.

SUMMARY OF THE INVENTION

Example embodiments include a system, corresponding card (e.g., line card, communications card, optical communications card, or apparatus), and corresponding method as follows. Some embodiments include a multi-channel optical layer system (and method and card). According to some embodiments, the system (and method and card) may include a multi-channel optical network interface layer, a multi-channel optical adapter layer, and a multi-channel optical function layer. The multi-channel optical adapter layer may learn functions and/or corresponding specifications from the multi-channel optical function layer. The multi-channel optical adapter layer may configure the multi-channel optical adapter layer itself to interoperate between the multi-channel optical network interface layer and the multi-channel optical function layer.

According to some embodiments, the multi-channel optical layer system may be a multi-channel multi-degree optical layer system. According to some embodiments, the system (and method and card) may include a multi-channel multi-degree optical network interface layer, a multi-channel multi-degree optical adapter layer, and/or a multi-channel multi-degree optical function layer. The multi-channel multi-degree optical adapter layer may learn functions and/or corresponding specifications from the multi-channel multi-degree optical function layer. The multi-channel multi-degree optical adapter layer may configure the multi-channel multi-degree optical adapter layer itself to interoperate between the multi-channel multi-degree optical network interface layer and the multi-channel multi-degree optical function layer.

According to some embodiments of the system (and method and card), the adapter layer may operate on a circuit board having a customizable form factor. According to some embodiments of the system (and method and card), the functions and/or corresponding specifications may be associated with at least one of the following: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), wavelength selective switching (WSS), and/or other functions and/or specifications known to one skilled in the art.

According to some embodiments of the system (and method and card), the multi-channel optical adapter layer may learn the functions and/or the corresponding specifications by retrieving information from one or more memory devices within the multi-channel optical function layer. The memory devices may include a programmable read-only memory (PROM), an electrically erasable programmable read-only memory (EEPROM), and/or any type of memory device known to one skilled in the art. The retrieved information (which may be retrieved from one or more of the memory devices) may be associated with at least one of the following: serial number, module type, checksum, inventory code, vendor code, part number, hardware revision level, software revision level, date of manufacture, version number, amplification, amplitude characteristics, phase characteristics, any other amplitude or phase characteristics of a device, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, end-of-file information, and/or other information known to one skilled in the art.

Some embodiments may include a multi-channel optical adapter card (and method and system). The multi-channel optical adapter card may include a micro-controller. The multi-channel optical adapter card may include circuitry responsive to the micro-controller. The micro-controller and/or the multi-channel optical adapter card (e.g., line card, communications card, optical communications card, or apparatus) may be configured to learn functions and/or corresponding specifications from plug-in modules (including but not limited to communication modules or optical communication modules). Based upon learning the functions and/or the corresponding specifications, the multi-channel optical adapter card (and/or microcontroller) may modify a configuration of the circuitry of the multi-channel optical adapter card itself. According to some embodiments, the multi-channel optical adapter card may be a multi-degree multi-channel optical adapter card. The micro-controller (of the adapter card) and the corresponding circuitry of the adapter card may be configurable to support traffic of a corresponding number of degrees.

The multi-channel optical adapter card may have a customizable form factor. The multi-channel optical adapter card may include a connector configured to plug into a slot in an electronics shelf of a network node. The multi-channel optical adapter card may include an adapter connector configured to plug into another adapter card in another slot in the electronics shelf of the network node.

According to some embodiments of the multi-channel optical adapter card (and method and system), the functions and/or corresponding specifications may be associated with at least one of the following: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), wavelength selective switching (WSS) and/or other functions and/or specifications known to one skilled in the art.

According to some embodiments of the multi-channel optical adapter card (and method and system), the multi-channel optical adapter card (and/or its microcontroller) may learn the functions and/or the corresponding specifications by retrieving information from one or more memory devices of the plug-in modules. The retrieved information may include at least one of the following: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, end-of-file information, and/or other information known to one skilled in the art.

According to some embodiments of the multi-channel optical adapter card (and method and system), the multi-channel optical adapter card may include at least one wavelength selective switch (WSS), circuitry to communicate via an optical supervisory channel (OSC), and/or a plurality of sockets. A socket herein may include, but is not limited to, an electrical and/or optical socket (e.g., a physical socket into which a module and/or connector may be physically plugged). Each socket may be configured to receive one or more of the plug-in modules. At least two of the plurality of sockets may have a same form factor.

Some embodiments may include a multi-channel optical layer method (and system and card). The multi-channel optical layer method may provide a multi-channel optical network interface layer. The method may provide a multi-channel optical adapter layer. The method may provide a multi-channel optical function layer. The multi-channel optical adapter layer may learn functions and/or corresponding specifications from the multi-channel optical function layer. The multi-channel optical adapter layer may configure the multi-channel optical adapter layer itself to interoperate between the multi-channel optical network interface layer and the multi-channel optical function layer.

According to some embodiments, the multi-channel optical layer method (and system and card) may have one or more degrees. The method may provide a multi-degree multi-channel optical network interface layer. The method may provide a multi-degree multi-channel optical adapter layer. The method may provide a multi-degree multi-channel optical function layer. The multi-degree multi-channel optical adapter layer may learn functions and/or corresponding specifications from the multi-degree multi-channel optical function layer. The multi-degree multi-channel optical adapter layer may configure the multi-degree multi-channel optical adapter layer itself to interoperate between the multi-degree multi-channel optical network interface layer and the multi-degree multi-channel optical function layer.

According to some embodiments of the multi-channel optical layer method (and system and card), the functions and/or corresponding specifications may be associated with at least one of the following: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), wavelength selective switching (WSS), and/or other functions and/or specifications known to one skilled in the art.

According to some embodiments of the multi-channel optical layer method (and system and card), the multi-channel optical adapter layer may learn the functions and/or the corresponding specifications by retrieving information from one or more memory devices within the multi-channel optical function layer. The retrieved information may be associated with at least one of the following: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, end-of-file information, and/or other information known to one skilled in the art.

Some embodiments may include an optical communications card (e.g., card, line card, or apparatus, and system and method) with at least one wavelength selective switch (WSS), circuitry to communicate via an optical supervisory channel (OSC), and/or a plurality of sockets each configured to receive a communication module (e.g., plug-in module). At least two of the sockets of the optical communication card may have the same form factor. The communication module may have one or more of line booster functionality, local booster functionality, pre-amplifier functionality, and/or optical channel monitor functionality. The optical communication card may comprise a connector configured to plug into a slot on a shelf. The optical communication card (e.g., adapter card) may comprise an adapter connector configured to plug into another adapter card that is plugged into a slot on a shelf.

Some embodiments may include an optical communications module (e.g., plug-in module) that may have a connector configured to plug into a first socket on a communications card (e.g., line card or apparatus). The optical communications module may communicate via optical and/or electrical signals with the communications card. The optical communication module may have one or more second sockets to receive optical fiber connectors. The first optical information may be received at the optical communication module via a first of the one or more second sockets. The optical communication module may also have circuitry to control the communication module. The circuitry may include circuitry that processes the received optical information.

According to some embodiments of the optical communication module, second optical information may be transmitted via a second of the one or more second sockets. The first optical information may be the same as the second optical information. The optical communication module may be configured to have one or more of line booster functionality, local booster functionality, pre-amplifier functionality, and/or optical channel monitor (OCM) functionality.

Some embodiments may receive first optical information from an optical network via a first optical connector in a first communication module. The first communication module may be plugged into a socket in a communication card. The communication card may be plugged into a slot in an optical node of the optical network. Second optical information may be transmitted via a second optical connector in the first communication module to a wavelength selective switch (WSS) in the communication card. Third optical information may be received via a first optical connector in a second communication module. The second communication module may be plugged into a second plug in the communication card. Fourth optical information may be transmitted to the optical network via a second optical connector in the second communication module. Fifth optical information may be transmitted by the WSS. The fifth optical information may be received by a first optical connector in a third communication module. Sixth optical information may be transmitted to a remote optical multiplexer-demultiplexer (remote OMD) via a second optical connector in the third communication module. The sixth optical information may be part of the first optical information.

According to some embodiments, the first communication module may pre-amplify the received first optical information prior to transmitting to the WSS. According to some embodiments, the fourth optical information may be line boosted prior to transmitting to the optical network. According to some embodiments, the sixth optical information may be locally boosted prior to transmitting to the remote OMD.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 illustrates example degrees of cascading in accordance with some embodiments.

FIG. 7 illustrates flexible add/drop functionality in accordance with some embodiments.

DETAILED DESCRIPTION OF THE INVENTION

Figure 1A:
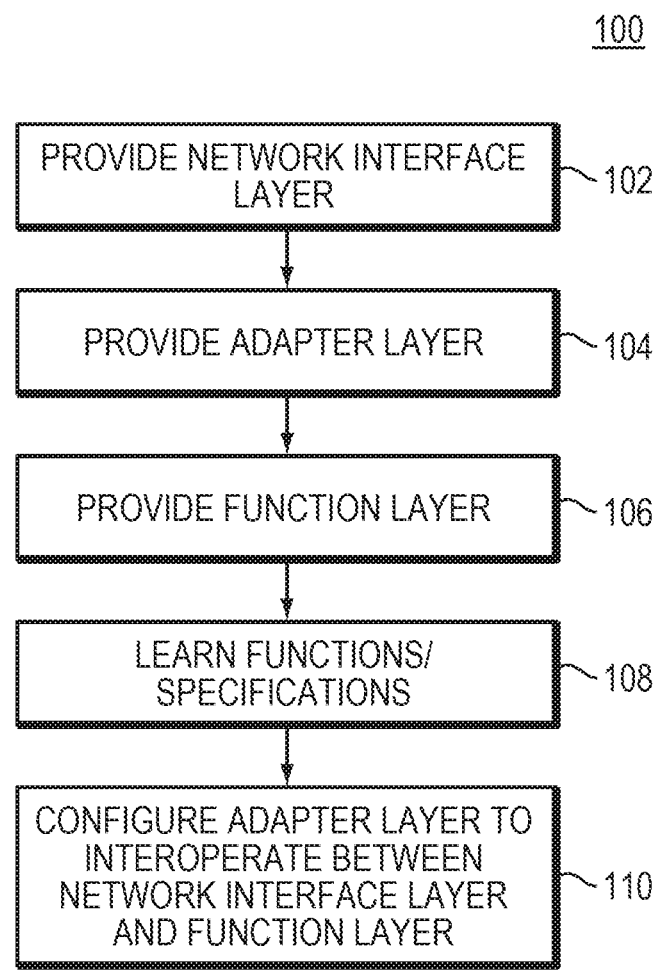
FIG. 1A is a flowchart of a multi-channel optical layer method, according to some embodiments.

A description of example embodiments of the invention follows. These descriptions are examples only and are not meant to convey all possible descriptions of the embodiments of the invention. According to some embodiments, signals that may be shown to be in one direction may also be bi-directional. As such, according to some embodiments, signals may operate on a single fiber and/or multiple fibers.

Thus, a flexible and customizable system, corresponding method, and corresponding card (e.g., line card, communications card, optical communications card, or apparatus) for improving flexibility and efficiency of a configuration of functionalities for an optical network is presented. As such, some embodiments are directed to a system, corresponding card, and corresponding method that remedies the deficiencies of the above-mentioned types of nodes. In addition, some embodiments provide a system, corresponding method, and corresponding card (apparatus) for modular reconfigurable optical add-drop multiplexing (ROADM) and/or remote dense wavelength division multiplexing (DWDM) wavelength add/drop (ADD/DROP).

Example embodiments include a system, corresponding card (e.g., line card, communications card, optical communications card, or apparatus), and corresponding method as follows. Some embodiments include a multi-channel optical layer system (and method and card). According to some embodiments, the system (and method and card) may include a multi-channel optical network interface layer, a multi-channel optical adapter layer, and a multi-channel optical function layer. The multi-channel optical adapter layer may learn functions and/or corresponding specifications from the multi-channel optical function layer. The multi-channel optical adapter layer may configure the multi-channel optical adapter layer itself to interoperate between the multi-channel optical network interface layer and the multi-channel optical function layer.

The addition of an adapter layer between a network interface layer and a function layer provides several benefits/advantages, according to some embodiments. Whereas prior approaches have functionality fixed in the function layer by using line cards with fixed functionality, some embodiments may provide a configurable functionality by the addition of an adapter layer. An adapter layer (and adapter card) may enable a user to select from a desired amount and type of functionality, thereby improving efficiency, and reducing unused hardware, as a user may select the desired functionality rather than being limited to fixed functionality.

The adapter layer (multi-channel optical adapter layer and corresponding adapter card) therefore may provide flexibility in the size of configured functionality. The adapter layer may reduce cost of configuration because functions may be discretized. New markets may be reached because of this reduced cost due to smaller size configurations (of hardware and software), reduced electronics, reduced power, and improved thermal cooling requirements for lesser-developed network configurations.

Whereas fixed line cards typically have a limited number of versions, an adapter layer allows for several (e.g., thousands or more) versions of modules having different functionality. The adapter layer (adapter card) may receive and control pluggable modules of the function layer that have various functionality. Thus, the adapter layer allows a user to easily and quickly reconfigure different versions of hardware in the field. Also, having different versions/configurations may allow a system designer to compensate for lack of accuracy.

Previous designs perform control of functionality through the network interface layer (e.g., system controller). By contrast, some embodiments do not require control at the network interface layer, but may handle control of functions through an adapter layer. This shift of control functionality moves intelligence to the adapter layer, thereby relieving a user from having to execute commands to configure and/or control functionality.

The adapter layer may operate in conjunction with plug-in modules (that may reside in the adapter layer and/or function layer). These plug-in (pluggable) modules may be independent any may not require system control. One advantage is that the plug-in modules may be plug and play, i.e., system software is not required for their configuration/control.

Another advantage of the adapter layer is that the adapter layer may include a controller (such as an FPGA) to control the plug-in modules. Another advantage is that in the adapter layer, the plug-in modules may bypass the function of the controller. The plug-in modules may be removed/inserted and plugged into a completely different system.

FIG. 1A is a flowchart of a multi-channel optical layer method (and system, and card/apparatus) 100, according to some embodiments. The multi-channel optical layer method (and system, and card/apparatus) 100 may provide a multi-channel optical network interface layer 102. The multi-channel optical network interface layer 102 may perform functions including, but not limited to, any functions known to one skilled in the art for a network interface layer 102. According to some embodiments, the network interface layer 102 may operate as a data link layer, link layer, physical interface layer, and/or other network layer. According to some embodiments, the network interface layer 102 may operate as a physical interface between the host system (e.g., system controller) and the hardware of the network (including, but not limited to elements 122, 124, 126, 128, 138 in FIG. 1B to follow). According to some embodiments, the network interface layer 102 may perform system control and communications with other network nodes.

Also shown in FIG. 1A, according to some embodiments, the method 100 may provide a multi-channel optical adapter layer 104. According to some embodiments, the multi-channel optical adapter layer 104 may perform system control, communications (e.g., data path communications or data) with other network nodes, handling of functionality, and/or other features. The multi-channel optical network adapter layer 104 may perform a variety of adapter functions in accordance with embodiments disclosed herein. According to some embodiments, the multi-channel optical adapter layer 104 may configure and/or control the hardware of the network (including, but not limited to, elements 122, 124, 126, 128, 138 in FIG. 1B to follow). According to some embodiments, the multi-channel optical adapter layer 104 may be controlled by the pluggable hardware (including, but not limited to, elements 126, 128 in FIG. 1B to follow).

As shown in FIG. 1A, the method 100 may provide a multi-channel optical function layer 106. The multi-channel optical function layer 106 may include one or more modules, functions, plug-in modules, and/or other components that perform functionality associated with an optical network, as known to one skilled in the art. The multi-channel optical adapter layer 104 may learn 108 functions and/or corresponding specifications from the multi-channel optical function layer 106. The multi-channel optical adapter layer 104 may configure 110 the multi-channel optical adapter layer 104 itself to interoperate between the multi-channel optical network interface layer 102 and the multi-channel optical function layer 106.

In some embodiments, the multi-channel optical adapter layer 104 may control plug-in modules (of the multi-channel optical function layer 106 and/or the multi-channel optical adapter layer 104). In other embodiments the plug-in modules may have their own independent control functionality. As such, in some embodiments, plug-in modules (that may reside within the optical adapter layer 104 and/or optical function layer 106) may perform control functionality after receiving power from the multi-channel optical adapter layer 104. In some embodiments, after receiving power, the plug-in modules control themselves, so they do not have to receive control/commands from other modules in order to perform desired functionality. However, in some embodiments, a controller located in the adapter layer may control/command the plug-in modules.

According to some embodiments, the multi-channel optical layer method 100 may have one or more degrees. The method 100 may provide a multi-degree multi-channel optical network interface layer 102. The method 100 may provide a multi-degree multi-channel optical adapter layer 104. The method may provide a multi-degree multi-channel optical function layer 106. The multi-degree multi-channel optical adapter layer 104 may learn 108 functions and/or corresponding specifications from the multi-degree multi-channel optical function layer 106. The multi-degree multi-channel optical adapter layer 104 may configure 110 the multi-degree multi-channel optical adapter layer 104 itself to interoperate between the multi-degree multi-channel optical network interface layer 102 and the multi-degree multi-channel optical function layer 106.

According to some embodiments of the multi-channel optical layer method 100, the functions and/or corresponding specifications may be associated with at least one of the following: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), wavelength selective switching (WSS), and/or other functions and/or specifications known to one skilled in the art.

Unlike existing approaches, according to some embodiments of the multi-channel optical layer method 100, the multi-channel optical adapter layer 104 may learn 108 the functions and/or the corresponding specifications by retrieving information from one or more memory devices within the multi-channel optical function layer 106. The memory devices may include a programmable read-only memory (PROM), an electrically erasable programmable read-only memory (EEPROM), and/or any type of memory device known to one skilled in the art. The retrieved information (which may be retrieved from one or more of the memory devices) may be associated with at least one of the following: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, and/or other information known to one skilled in the art.

Figure 1B:
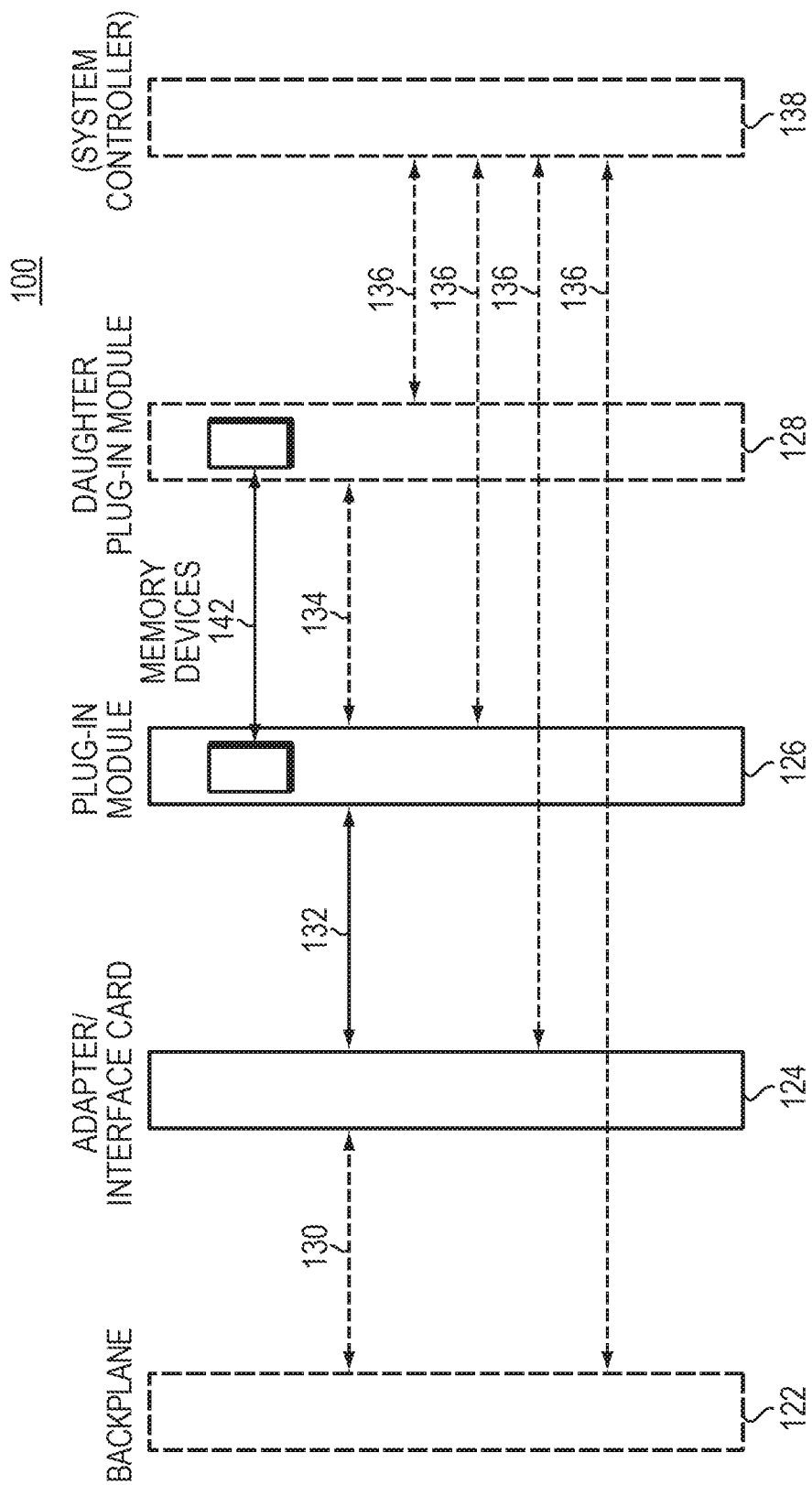
FIG. 1B is a block diagram of a multi-channel optical layer system, according to some embodiments.

FIG. 1B is a block diagram of an optical network environment, or multi-channel optical layer system, according to some embodiments. According to some embodiments, the system (and method and card) 100 may include the multi-channel optical network interface layer 102, multi-channel optical adapter layer 104, and/or multi-channel optical function layer 106 (of FIG. 1A). According to some embodiments, the multi-channel optical network interface layer (102 of FIG. 1A) may include a system controller 138. However, according to some embodiments, an adapter (and/or interface) card 124 may perform one or more system control functions instead of the system controller 138. According to some embodiments, the multi-channel optical adapter layer (104 of FIG. 1A) may include an adapter (and/or interface) card 124.

As illustrated in FIG. 1B, according to some embodiments, one or more plug-in modules 126 and/or one or more daughter plug-in modules 128 may be included in the multi-channel optical function layer. According to some embodiments, daughter plug-in modules 128 may, in turn, have children plug-in modules, and so forth. According to some embodiments, there is no limit to the number of plug-in modules (126, 128, and/or other plug-in modules) that may plug into one another and/or to the adapter card 124.

As illustrated in FIG. 1B, according to some embodiments, the system controller 138 may communicate 136 with one or more backplanes 122, an adapter (and/or interface) card 124, one or more plug-in modules 126, and/or one or more daughter plug-in modules 128. Forms of interconnection (e.g., communication) 130, 132, 134, 136 may include, but are not limited to, electrical communications/connections, optical communications/connections, digital and/or analog communications, power pins, preset pins, and electrical and/or optical sockets, but these forms of interconnection 130, 132, 134, 136 are not so limited.

As shown in FIG. 1B, according to some embodiments, the multi-channel optical adapter layer may learn functions and/or corresponding specifications from the multi-channel optical function layer. The multi-channel optical adapter layer may configure the multi-channel optical adapter layer itself (for non-limiting example, through the adapter card 124) to interoperate between the multi-channel optical network interface layer and the multi-channel optical function layer.

According to some embodiments, the multi-channel optical layer system 100 may be a multi-channel multi-degree optical layer system. According to some embodiments, the system (and method and card) 100 may include a multi-channel multi-degree optical network interface layer, a multi-channel multi-degree optical adapter layer, and/or a multi-channel multi-degree optical function layer. The multi-channel multi-degree optical adapter layer may learn functions and/or corresponding specifications from the multi-channel multi-degree optical function layer. The multi-channel multi-degree optical adapter layer may configure the multi-channel multi-degree optical adapter layer itself to interoperate between the multi-channel multi-degree optical network interface layer and the multi-channel multi-degree optical function layer.

According to some embodiments of the system (and method and card) 100, the adapter layer may have a customizable form factor. The form factor may be not only customizable, but also may conform to any industry standard. According to some embodiments of the system (and method and card) 100, the functions and/or corresponding specifications may be associated with at least one of the following: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), and/or wavelength selective switching (WSS). According to some embodiments, one or more of these functions and/or corresponding specifications may be present on one or more of the plug-in modules 126, 128, and/or present on the adapter card 124 itself.

As shown in FIG. 1B, according to some embodiments of the system (and method and card) 100, the multi-channel optical adapter layer may learn the functions and/or the corresponding specifications (of the plug-in modules 126, 128) by retrieving information from one or more memory devices 142 within the multi-channel optical function layer. The one or more memory devices 142 may include a programmable read-only memory (PROM), an electrically erasable programmable read-only memory (EEPROM), and/or another type of memory device. The retrieved information (which may be retrieved from the memory devices 142) may be associated with at least one of the following: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, end-of-file information, and/or other information known to one skilled in the art.

As shown in FIG. 1B, some embodiments may include a multi-channel optical adapter card (and method and system) 124. The multi-channel optical adapter card (e.g., line card, communications card, optical communicationscard, or apparatus) 124 may be configured to learn functions and/or corresponding specifications from plug-in modules (e.g., communication module and/or optical communication module) 126, 128.

Figure 1C:
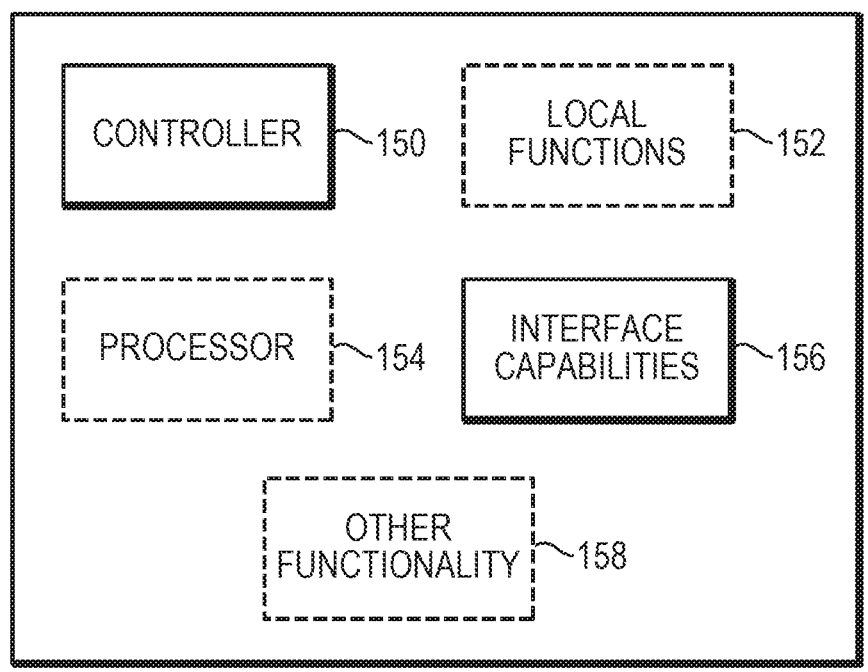
FIG. 1C is a high level block diagram of the adapter (and/or interface) card of FIG. 1B, according to some embodiments.

As shown in FIG. 1C, the adapter card 124 may include various functionality known to one skilled in the art, including, but not limited to, a controller 150 that may include a field programmable gate array (FPGA), complex programmable logic device (CPLD), or other type of controller, which may be configured to learn functions and/or corresponding specifications from plug-in modules 126, 128. The controller 150 (e.g., FPGA) may include configuration tables and the FPGA may re-configure itself and reconfigure the hardware on the adapter card 124 based upon communications (data or control) between the adapter card 124 and the pluggable modules 126, 128 (of FIG. 1B) or communications (data or control) within the adapter card 124 itself.

The adapter card 124 may also include a processor 154 that may work in conjunction with the controller 150 to learn functions and/or corresponding specifications from plug-in modules 126, 128 (of FIG. 1B). According to some embodiments, local functions 152, interface capabilities 156, and/or other functionality 158 may be used in conjunction with the controller 150 and/or the processor 154 in order to learn functions and/or corresponding specifications from plug-in modules 126, 128 (of FIG. 1B).

As such, in some embodiments, the plug-in modules (126, 128 of FIG. 1B) may have additional features that allow them to be self-sustainable if the adapter card 124 does not have controller 150 functionality. In such embodiments where the adapter card 124 provides power to the plug-in modules (126, 128 of FIG. 1B), but does not have controller 150 functionality, the multi-channel optical layer system may be controlled by the plug-in modules, rather than being controlled by the multi-channel optical adapter layer (including adapter card 124). The multi-channel optical function layer (including plug-in modules 126, 128) may be configured to learn functions and corresponding specifications from the multi-channel optical function layer. The multi-channel optical function layer may be configured to configure the multi-channel optical adapter layer (including adapter card 124) to interoperate between the multi-channel optical network interface layer and the multi-channel optical function layer. In some embodiments, the plug-in modules (126, 128 of FIG. 1B) may diagnose themselves.

As shown in FIG. 1C, according to some embodiments, one or more of the functions 150, 152, 154, 156, 158 of the adapter card 124 may be used to retrieve (e.g., learn) functions and/or corresponding specifications from plug-in modules 126, 128 (of FIG. 1B). According to some embodiments, one or more of the functions 150, 152, 154, 156, 158 of the adapter card 124 may be used to retrieve (e.g., learn) functions and/or corresponding specifications from plug-in modules 126, 128 (of FIG. 1B) through memory devices 142 (of FIG. 1B) that may be located on one or more of the plug-in modules 126, 128 (of FIG. 1B).

As shown in FIG. 1C, based upon learning the functions and/or the corresponding specifications (from plug-in modules 126, 128, and optionally from the adapter card 124 itself), the multi-channel optical adapter card 124 may modify a configuration of the multi-channel optical adapter card 124 itself. Such a modified configuration may include modification (and/or access to or from) one or more of the features/functions 150, 152, 154, 156, 158 of the adapter card 124.

As shown in FIG. 1C, the features/functions 150, 152, 154, 156, 158 of the adapter card 124 may include, but are not limited to, the following: clock generation, timer functionality, joint test action group (JTAG) functionality, connector functionality, double data rate (DDR) memory, DDR memory interfacing, flash memory, other types of memory, termination, decoupling, power, timing, Serializer/Deserializer (SERDES), a field programmable gate array (FPGA), complex programmable logic device (CPLD), light emitting diodes (LEDs), reset circuitry, ethernet switching, physical addressing, input biasing, power decoupling, physical connectors (female, male, or other types of connectors), 1-WIRE circuitry, fuse circuitry, OSC termination, timing synchronization, and/or any other type of circuitry known to one skilled in the art. In some embodiments, the adapter card may perform self-diagnosis of the operation of its features/functions.

Referring back to FIG. 1B, according to some embodiments, the multi-channel optical adapter card 124 may be a multi-degree multi-channel optical adapter card. The multi-channel optical adapter card may have a customizable form factor (e.g., the optical adapter card can have different sizes/form factors based upon a pluggable configuration). The multi-channel optical adapter card 124 may also include a connector 130 configured to plug into a backplane slot 122 of FIG. 1B (and/or any of slots 202, 204, 206, 208, 210, 212, 214, 232, 234, 236, 238, 262, 264, 266, 268 of FIGS. 2A-C) on a shelf (216 of FIGS. 2A-C).

In FIG. 1B, according to some embodiments of the multi-channel optical adapter card (and method and system) 124, the functions and/or corresponding specifications may be associated with at least one of the following: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), wavelength selective switching (WSS) and/or other functions or specifications known to one skilled in the art. According to some embodiments, one or more of these functions and/or corresponding specifications may be present on one or more of the plug-in modules 126, 128, and/or present on the adapter card 124 itself.

As shown in FIG. 1B, according to some embodiments of the multi-channel optical adapter card (and method and system) 124, the multi-channel optical adapter card 124 may learn the functions and/or the corresponding specifications by retrieving information from one or more memory devices 142 of the plug-in modules 126, 128 via one or more electrical and/or optical connections and/or communications 132, 134. The retrieved information may include at least one of the following: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, end-of-file information, and/or other information known to one skilled in the art.

Figure 1D:
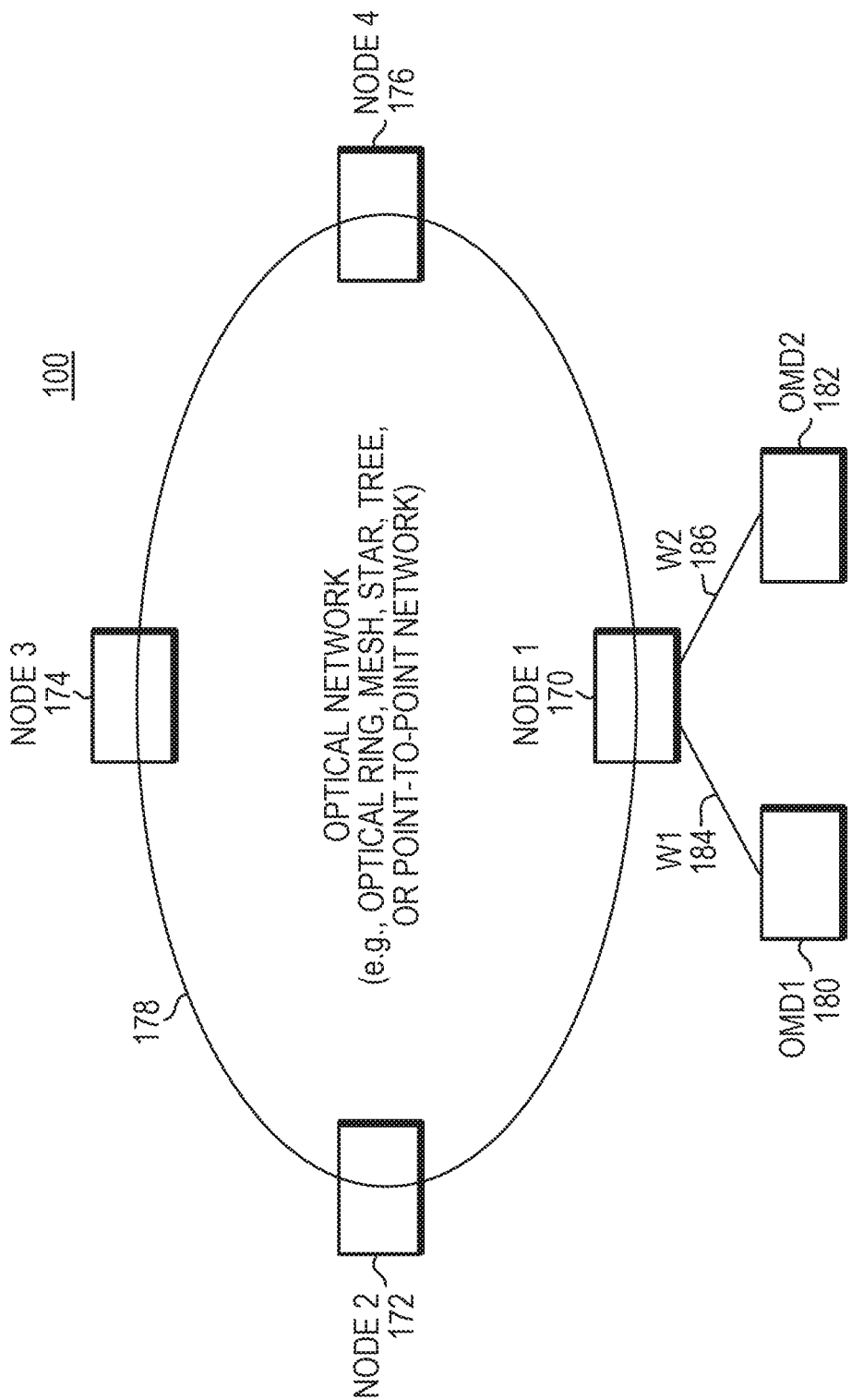
FIG. 1D illustrates an example of an optical network, which may be used in conjunction with some embodiments.

FIG. 1D illustrates an example of an optical network 178, which may be used in conjunction with some embodiments of the system (and method and card) 100. Embodiments depicted in FIG. 1D are understood to include point-to-point network topologies, star network topologies, mesh network topologies, tree network topologies, or other type of network topologies. Such embodiments may also support multi-degree applications.

The optical network 178 shows four nodes 170, 172, 176, 178. Node 1 (170), which may be an optical add-drop multiplexer (OADM), may receive optical signals and drop, for example, two wavelengths W1 (184) and W2 (186). In this example, W1 (184) may be transmitted to a first nearby optical multiplexer demultiplexer (OMD1, element 180), and from there demultiplexed information may be sent to one or more local users. Since the OMD1 (180) may be less than 1 meter away, no optical signal boosting may be required. In some embodiments, W2 (186) may be sent to a remote optical multiplexer demultiplexer (OMD2, element 182) 10 km from Node 1 (170), and, accordingly, may need to boost W2 (186) locally prior to transmission to OMD2 (182).

Figure 2A:
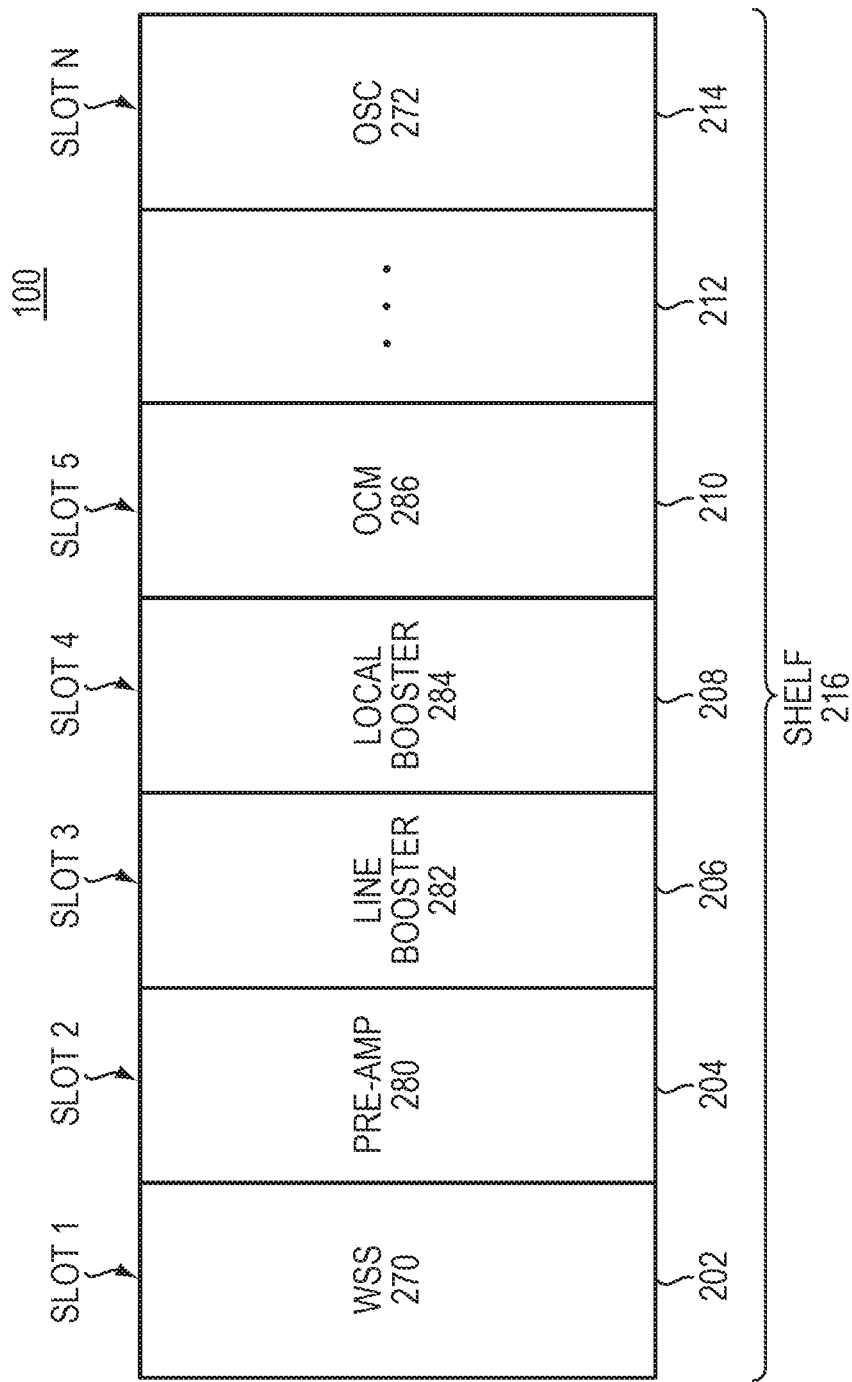
FIG. 2A illustrates a first type of node in an optical network, which may be used in conjunction with some embodiments.

FIG. 2A illustrates a first type of node in an optical network topology (including but not limited to a point-to-point network topology, star network topology, mesh network topology, tree network topology, or other type of network topology), which may be used in conjunction with some embodiments of the system (and method and card) 100 (of FIGS. 1A-D). In the optical network described in FIG. 1D, the node may comprise racks of equipment, with each rack comprising numerous shelves. FIG. 2A illustrates one such shelf 216. The shelf 216 may have N slots 202, 204, 206, 208, 210, 212, 214, where each slot 202, 204, 206, 208, 210, 212, 214 may receive a communication card. Each card may have a single functionality, or have mixed functionalities. Assuming a single functionality, there may be a wavelength selective switch (WSS) card 270 in Slot 1 (202), a pre-amplifier card 280 in Slot 2 (204), a line booster card 282 in Slot 3 (206), a local booster card 284 in Slot 4 (208), an optical channel monitor (OCM) card 286 in Slot 5 (210), and an optical supervisory channel (OSC) card 272 in Slot N (214). According to some embodiments, the remaining slots 212 between Slot 5 (210) and Slot N (214) may have more cards with any of these functionalities (270, 272, 280, 282, 284, 286) and/or other functionalities known to one skilled in the art. According to some embodiments, the architecture of FIG. 2A may be very flexible, but may be expensive because of the number of cards and because each card may be able to handle many wavelengths for great amounts of information traffic.

Figure 2B:
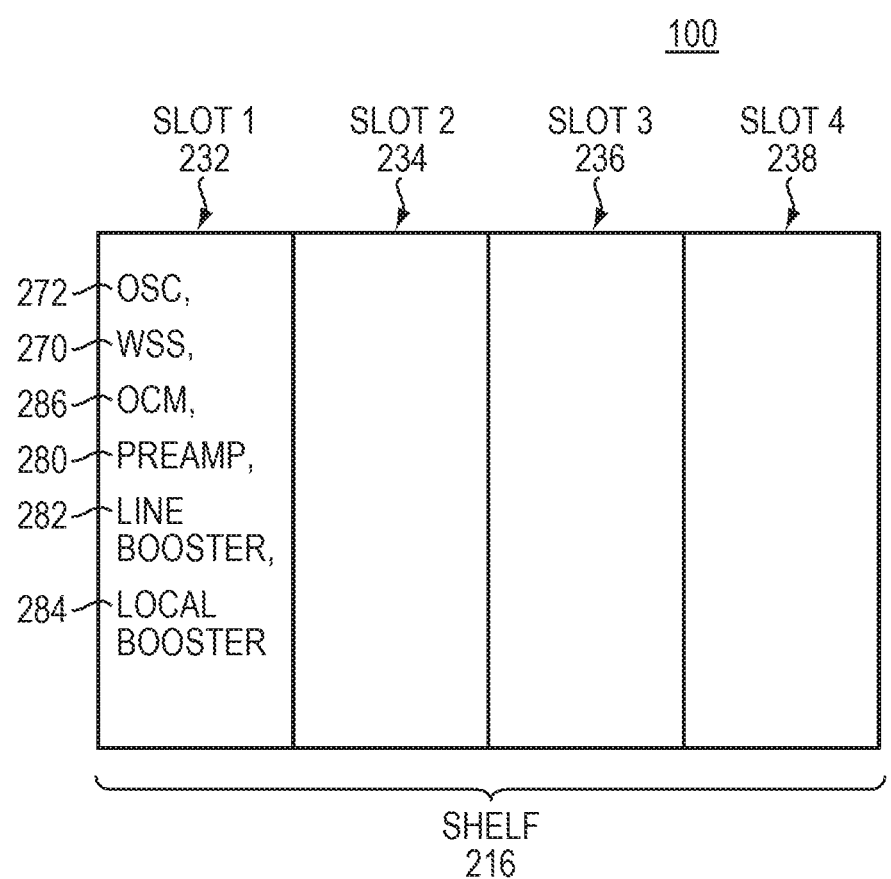
FIG. 2B illustrates a second type of node in an optical network, which may be used in conjunction with some embodiments.

As shown in FIG. 2B, another type of architecture may be used. According to some embodiments, the architecture of FIG. 2B may provide a trade-off of lower cost at the possible expense of flexibility. FIG. 2B illustrates a second type of node in an optical network topology (including but not limited to a point-to-point network topology, star network topology, mesh network topology, tree network topology, or other type of network topology), which may be used in conjunction with some embodiments of the system (and method and card) 100 (of FIGS. 1A-D). In this example of FIG. 2B, Node 1 (170) from FIG. 1D may be as shown with, for example, a single shelf 216 comprising 4 slots 232, 234, 236, 238. Slot 1 (232) may have a single communications card that has the following functionalities: OSC 272, WSS 270, OCM 286, pre-amplifier 280, line booster 282, and local booster 284. While the cost for this architecture may be lower than for the case of FIG. 2A, this architecture may be less flexible since a single card may have the above functionalities (OSC 272, WSS 270, OCM 286, pre-amplifier 280, line booster 282, and local booster 284). So, according to some embodiments, even if additional local boosters 284 are needed, a card that has local boosters 284 and/or other functionalities may be acquired.

Figure 2C:
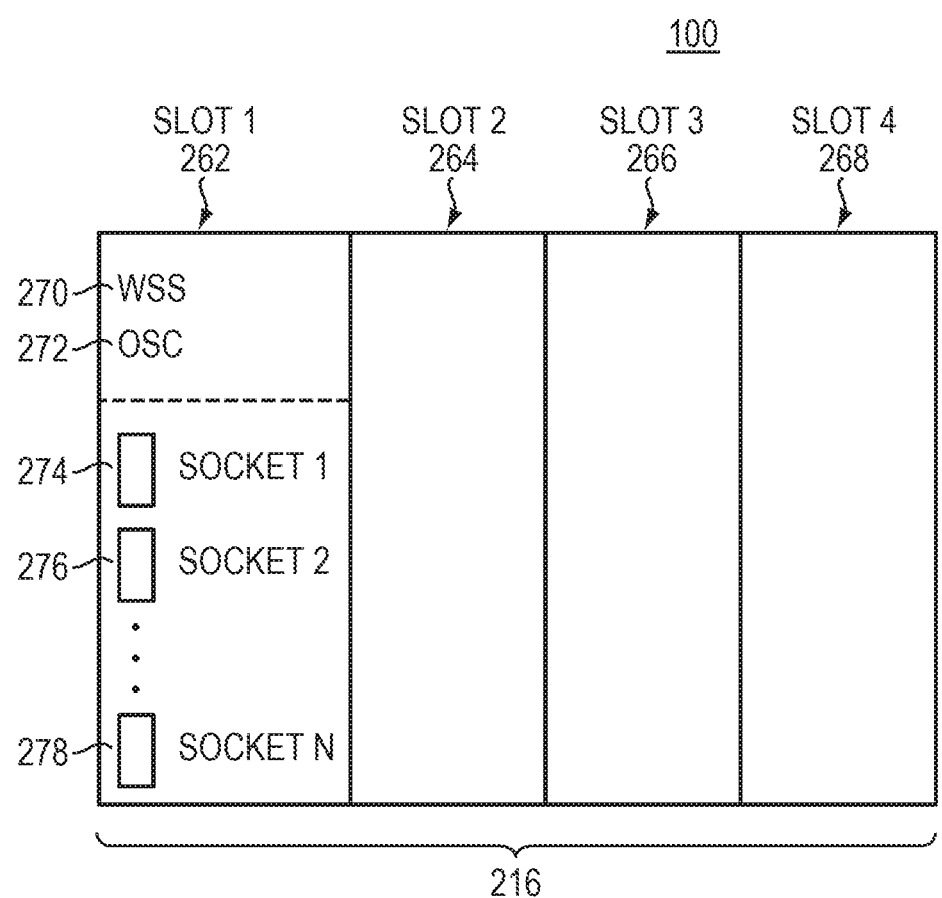
FIG. 2C illustrates a third type of node in an optical network in accordance with some embodiments.

FIG. 2C illustrates a third type of node in an optical network topology (including but not limited to a point-to-point network topology, star network topology, mesh network topology, tree network topology, or other type of network topology), in accordance with some embodiments of the system (and method and card) 100 (of FIGS. 1A-D). Some embodiments may include a communications card in slot 262 on a shelf 216, and the card in slot 262 may have WSS 270 and/or OSC 272 functionalities. In addition, there may be numerous sockets (Socket 1 through Socket N, elements 274, 276, 278) into which various modules may be plugged. For example, Socket 1 (274) may receive an OCM module, Socket 2 (276) may receive a pre-amplifier module, and so forth. In this way, only those functionalities that need to be supported need to be provided. For example, a local booster may be installed only when it is needed. Additionally, various modules may support more than one type of functionality. Although the slots 264, 266, 268 of FIG. 2C are shown as empty, they may be populated with communications cards in some embodiments.

Figure 3:
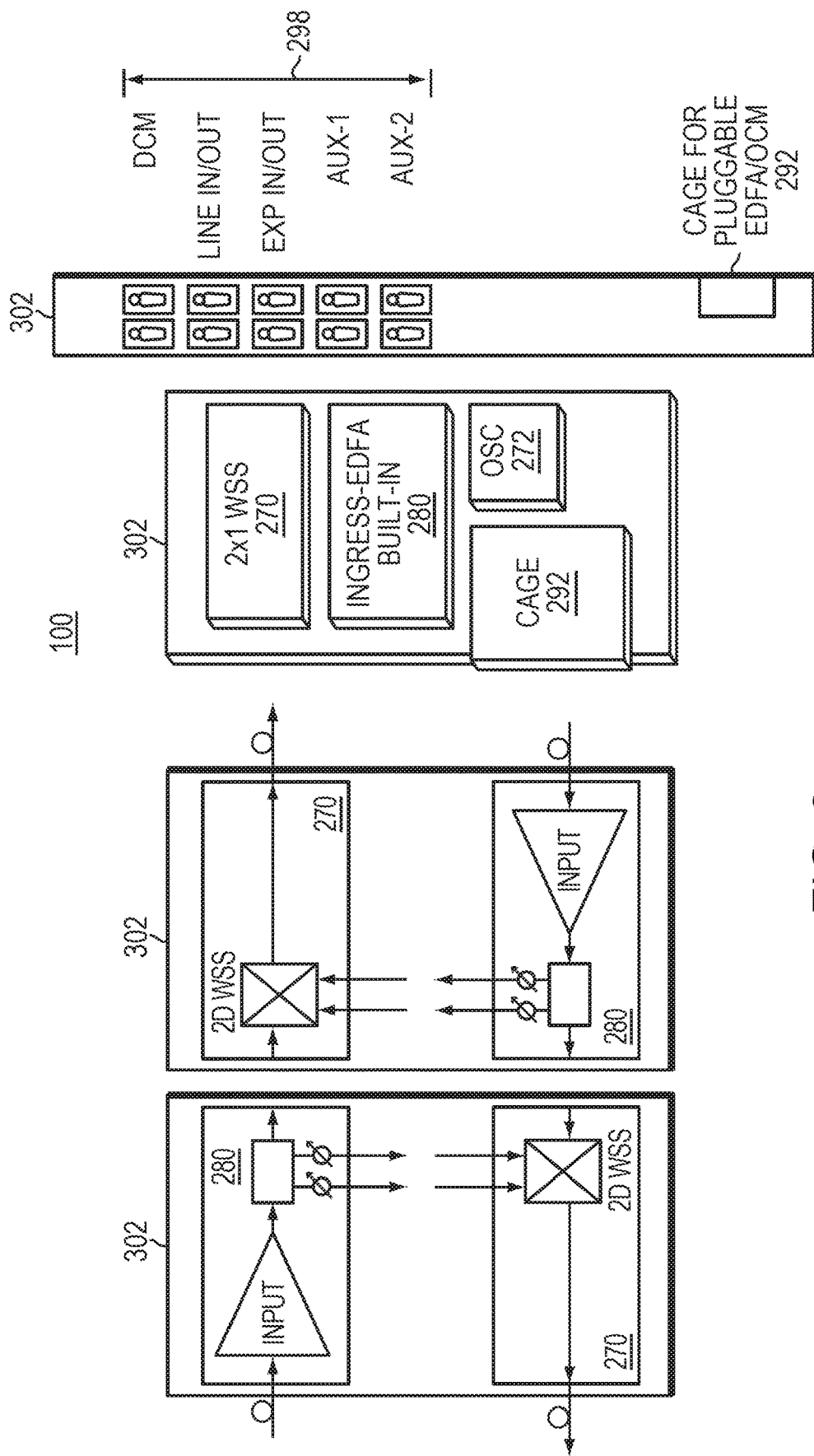
FIG. 3 illustrates a boosterless two-degree (2D) ROADM node in accordance with some embodiments.

FIG. 3 illustrates various views of a boosterless two-degree (2D) ROADM node 302 in accordance with some embodiments of the system (and method and card) 100. According to some embodiments, since boosters may not be required for the boosterless node 302, a stock communications card with WSS 270, OSC 272, and pre-amplifier 280 support may not need to be supplemented with modules having other functionalities. According to some embodiments, the node 302 may have up to 12 (decibel) dB support (including dispersion compensation loss, or DCM loss), but some embodiments are not so limited. According to some embodiments, the node 302 may have up to four spans before re-balancing is required, but some embodiments are not so limited. According to some embodiments, the node 302 may not require an output amplifier and/or an OCM. According to some embodiments, the node 302 may employ an OSC-based gain setting. According to some embodiments, the node 302 may include one or more input/output ports 298 (including but not limited to auxiliary ports) that may be used for various functionality, including, but not limited to, add/drop functionality.

According to some embodiments, the node 302 of FIG. 3 may include the multi-channel optical adapter card (and method and system) 124 of FIG. 1B. The multi-channel optical adapter card 124 of FIG. 1B (and/or node 302 of FIG. 3) may include at least one wavelength selective switch WSS 270, circuitry to communicate via an optical supervisory channel OSC 272, a built-in ingress module 280, and/or a plurality of sockets (or cage) 292. Each socket of the plurality of sockets (or cage) 292 may be configured to receive one or more of the plug-in modules. At least two of the plurality of sockets (or cage) 292 may have a same form factor. The node 302 of FIG. 3 (as well as the multi-channel adapter card 124 of FIG. 1B) may have one or more input/output ports 298 (including but not limited to auxiliary ports) for various functionalities including, but not limited to, add/drop functionalities.

Figure 4:
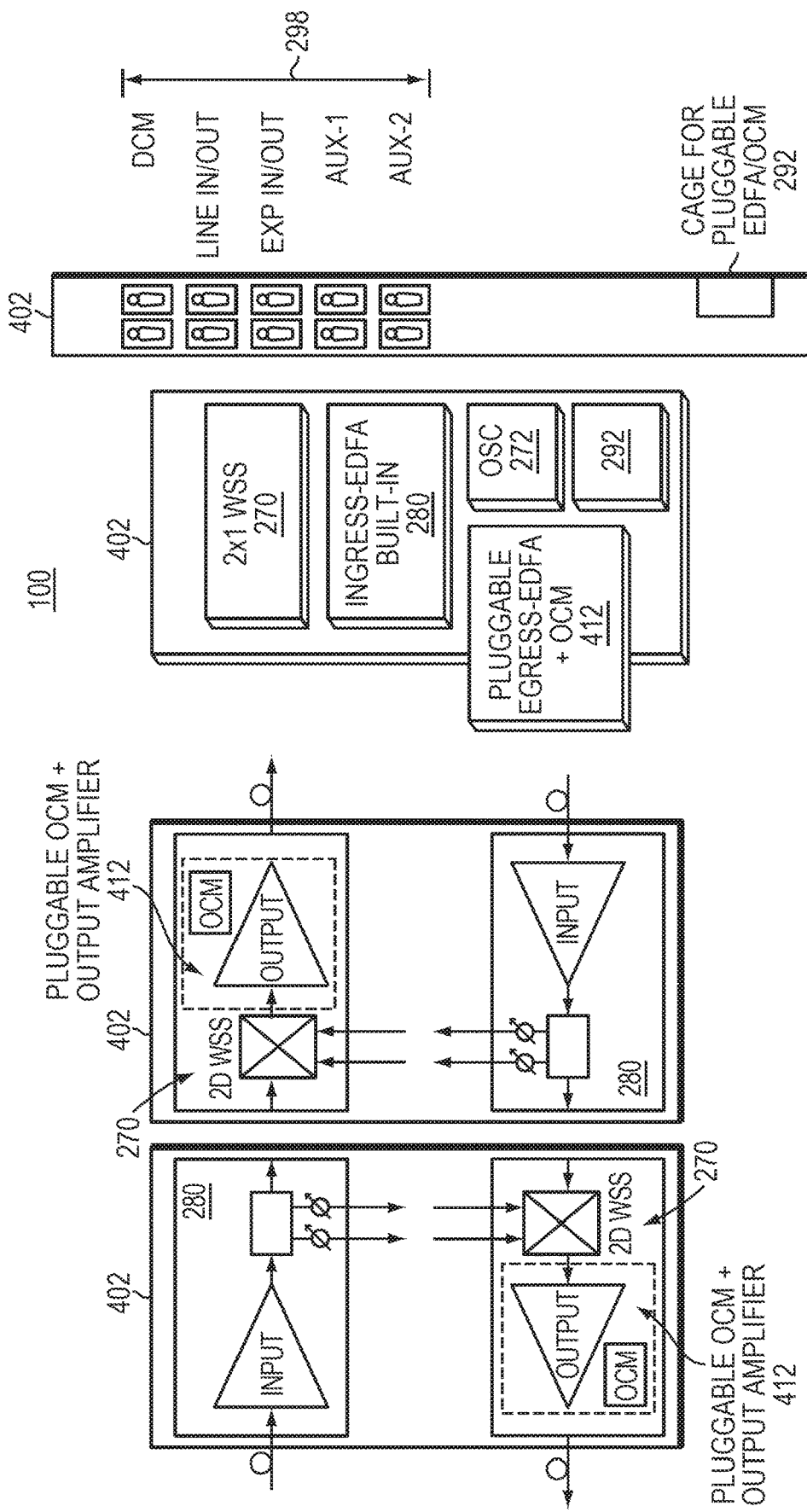
FIG. 4 illustrates a full two-degree (2D) ROADM node in accordance with some embodiments.

FIG. 4 illustrates various views of a two-degree (2D) ROADM node 402 in accordance with some embodiments of the system (and method and card) 100. This example shows a configuration similar to FIG. 3 but with the addition of a plug-in module 412 that has both optical channel monitor (OCM, element 286 of FIGS. 2A-B) and line booster (element 282 of FIGS. 2A-B) functionalities. The node 402 of FIG. 4 may include at least one wavelength selective switch WSS 270, circuitry to communicate via an optical supervisory channel OSC 272, a built-in ingress module 280, and/or a plurality of sockets (or cage) 292 into which pluggable modules 412 may connect/attach. The node 402 of FIG. 4 may have one or more input/output ports 298 (including but not limited to auxiliary ports) for various functionalities including but not limited to add/drop functionalities. According to some embodiments, the node 402 of FIG. 4 may include the multi-channel optical adapter card (and method and system) 124 of FIG. 1B.

According to some embodiments, the node 402 may have up to 24 (decibel) dB support (including dispersion compensation loss, or DCM loss), but some embodiments are not so limited. According to some embodiments, the node 402 may include a pluggable OCM and booster (output amplifier). The pluggable OCM and booster may conform to any industry standard form factor of custom form factor. According to some embodiments, the node 402 may be field upgradable and/or the OAMD of node 402 may have a same part number as in the boosterless node 302 of FIG. 3. According to some embodiments, the node 402 may have the same cascadeability as in existing four-degree (4D) or eight-degree (8D) applications. According to some embodiments, the node 402 may include 4D and/or 8D support, including, but not limited to, balance ability and/or a two-port OPM (optical performance monitor). According to some embodiments, the node 402 may include one or more input/output ports 298 (including but not limited to auxiliary ports) that may be used for various functionality, including, but not limited to, add/drop functionality.

Figure 5A:
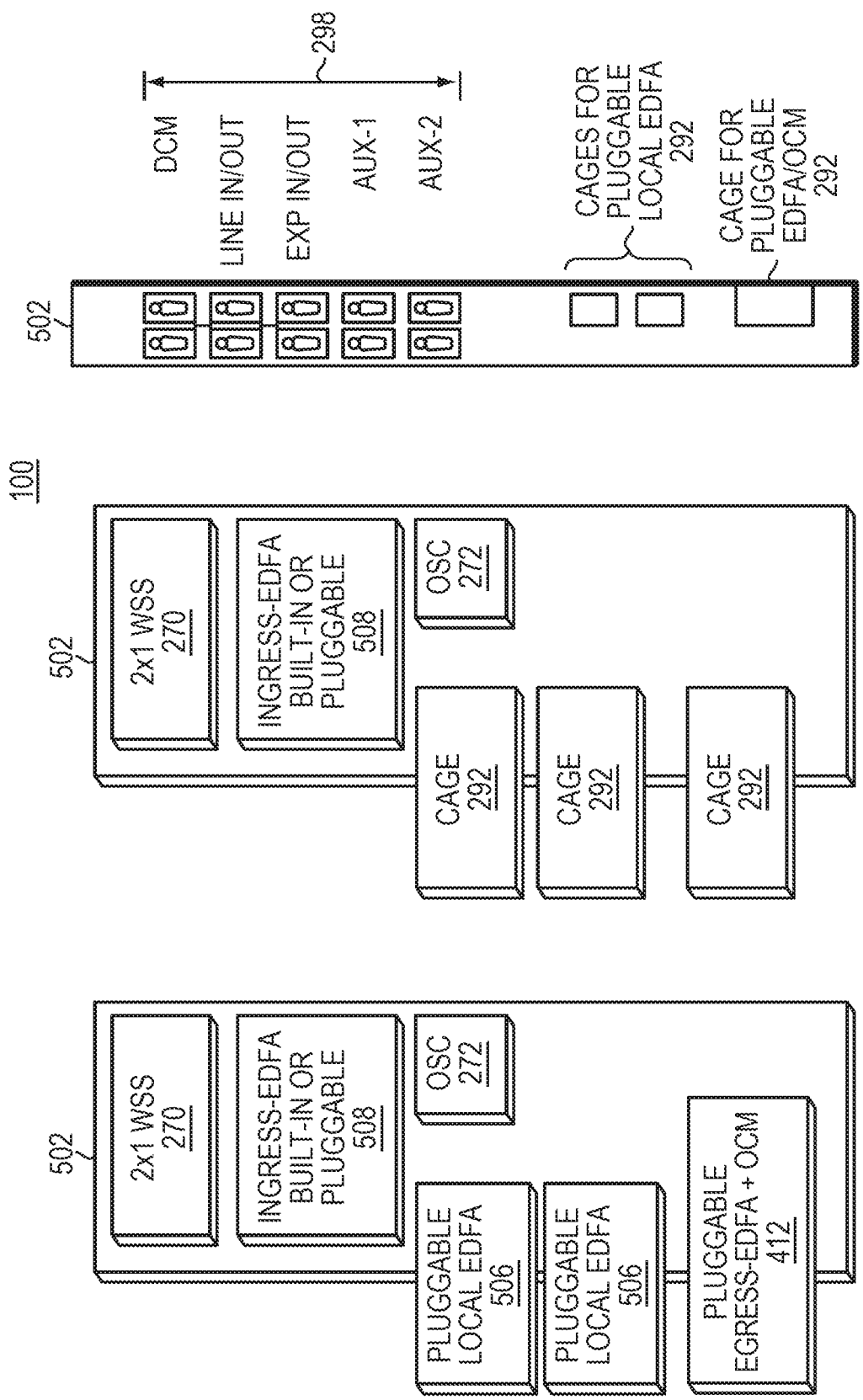
FIG. 5A illustrates another two-degree (2D) ROADM node in accordance with some embodiments.

FIG. 5A illustrates various views of another two-degree (2D) reconfigurable optical add-drop multiplexing (ROADM) node 502 in accordance with some embodiments of the method (and system and card) 100. FIG. 5A shows how a stock communications card 502 similar to those described in FIGS. 3-4 may accept modules with pluggable local booster functionality 506 and/or pluggable OCM (and/or line booster) functionality 412. According to some embodiments, the node 502 of FIG. 5A may include the multi-channel optical adapter card (and method and system) 124 of FIG. 1B. The node 502 of FIG. 5A may include at least one wavelength selective switch WSS 270, circuitry to communicate via an optical supervisory channel OSC 272, a built-in and/or pluggable ingress module 508, and/or a plurality of sockets (or cage) 292 into which pluggable modules 412, 506, and/or 508 may connect/attach. The node 502 of FIG. 5A may have one or more input/output ports 298 (including but not limited to auxiliary ports) for various functionalities including, but not limited to, add/drop functionalities.

Figure 5B:
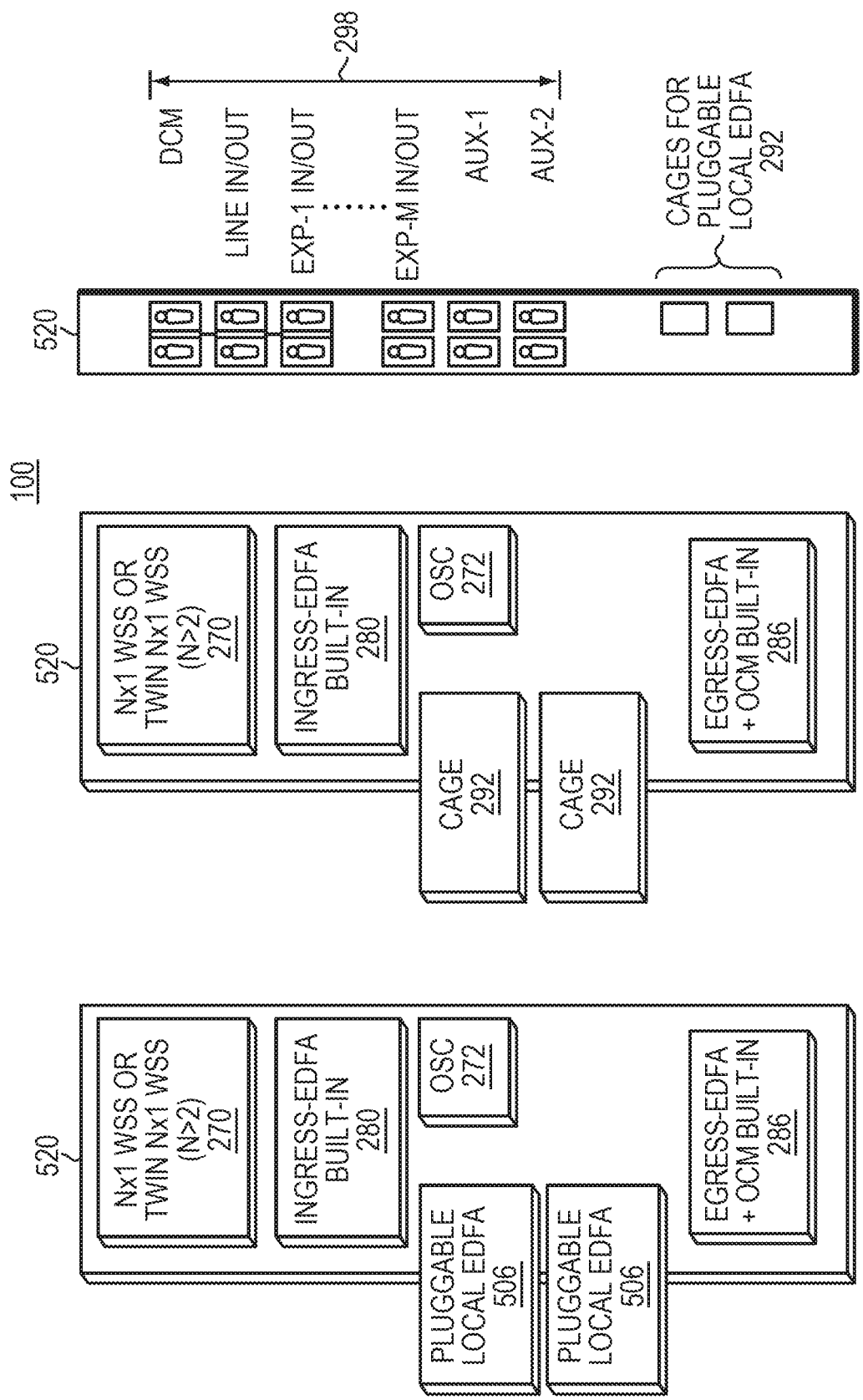
FIG. 5B illustrates a multiple degree ROADM node in accordance with some embodiments.

FIG. 5B illustrates various views of a multiple degree ROADM node 520 in accordance with some embodiments of the system (and method and card) 100. This example shows a stock communication card 520 similar to the cards 502 described in FIG. 5A that can be used with greater than two degree OADMs. While a communications card may be design dependent, this figure shows an embodiment of the invention in which the communications card has built-in pre-amplifiers 280, as well as built-in line boosters and/or built-in OCM (286). Other modules, such as, for example, local booster modules 506 can then be plugged in as needed to the cages 292. According to some embodiments, the node 520 of FIG. 5B may include the multi-channel optical adapter card (and method and system) 124 of FIG. 1B. The node 520 of FIG. 5A may include at least one wavelength selective switch WSS 270, circuitry to communicate via an optical supervisory channel OSC 272, a built-in ingress module 280, a built-in egress module 286, and/or a plurality of sockets (or cage) 292 into which pluggable modules 506 may connect/attach. The node 502 of FIG. 5A may have one or more input/output ports 298 (including, but not limited to, auxiliary ports) for various functionalities including, but not limited to, add/drop functionalities.

FIG. 6 illustrates example cascade degrees in accordance with some embodiments of the system (and method and card) 100. According to some embodiments, assuming boosterless/OCM-less nodes may cascade from one to three times (4 spans) before re-balancing is required, a first node on the left hand side 602 may be equipped with a pluggable OCM/line boost module 412 as shown in FIG. 4 and FIG. 5A. According to some embodiments, nodes (602, 604, 606, 608, 610) may cascade more than three times before re-balancing is required. According to some embodiments, balancing may be software-assisted (e.g., using a remote OCM) to improve the cascade degree. Next, the next three nodes 604, 606, 608 may use the stock communication card with no modules plugged in, and the last node on the right hand side 610 may be equipped with one or more OCM/line booster modules 412. According to some embodiments, the number of cascades may be increased by software assisted balancing using a remote OCM. According to some embodiments, the number of cascades may depend on transmission power and receiver sensitivity. According to some embodiments, transmission (Tx) power may be in the 1 dBm to 3 dBm (decibel-milliwatt) range, but some embodiments are not so limited. According to some embodiments, receive (Rx) sensitivity may be better than −22 dBm and/or may have a better LOS (or loss of signal).

FIG. 7 illustrates flexible add/drop functionality in accordance with some embodiments of the system (and method and card) 100, which may include one or more pre-amplifier cards 280 and/or WSS cards 270. FIG. 7 shows 44/48 channel support (702) using a single OMD 710 in each direction and 88/96 channel support (706) using two OMDs 710 in each direction. Since the OMDs 710 of FIG. 7 may be near OMDs, no local boosting modules are required. However, according to some embodiments, as shown in FIG. 7, pluggable OCM and/or line boosting modules 412 may be used.

Figure 8:
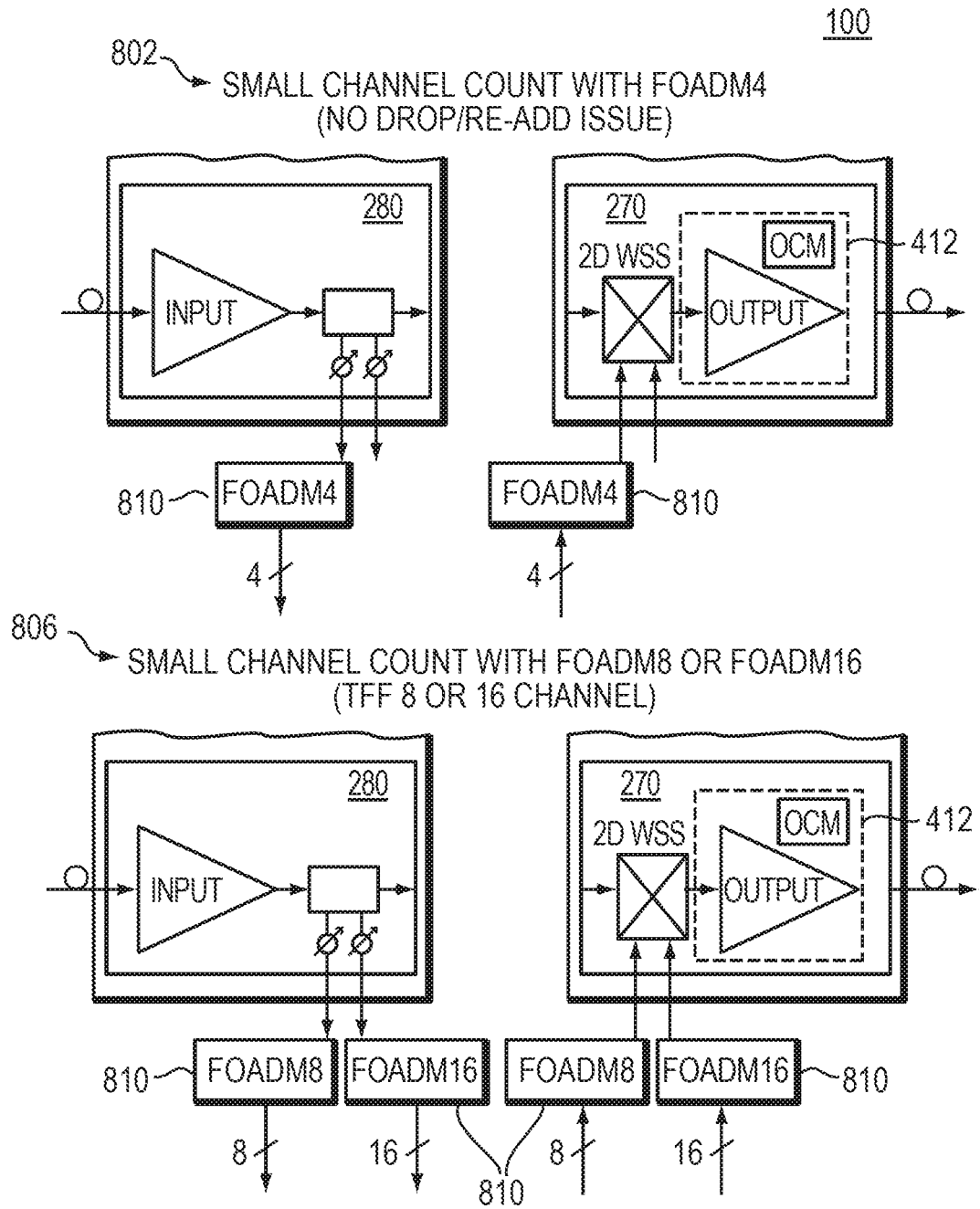
FIG. 8 illustrates other flexible add/drop functionality in accordance with some embodiments.

FIG. 8 illustrates another flexible add/drop functionality in accordance with some embodiments of the system (and method and card) 100 which may include one or more pre-amplifier cards 280 and/or WSS cards 270. FIG. 8 shows support for a number of channels using fixed OADMs (FOADM) 810. For example, 4 channels may be supported 802 with single FOADMs 810 in each direction (e.g., transmit and receive) or a larger number of channels may be supported 806 using one or more of 8 channel or 16 channel FOADMs 810 in each direction (e.g., transmit and receive). Since the FOADMs 810 may be near OMDs (for example, less than 2 meters from the node), no local boosting modules are required. However, according to some embodiments, pluggable OCM and/or line boosting modules 412 may be used.

Figure 9:
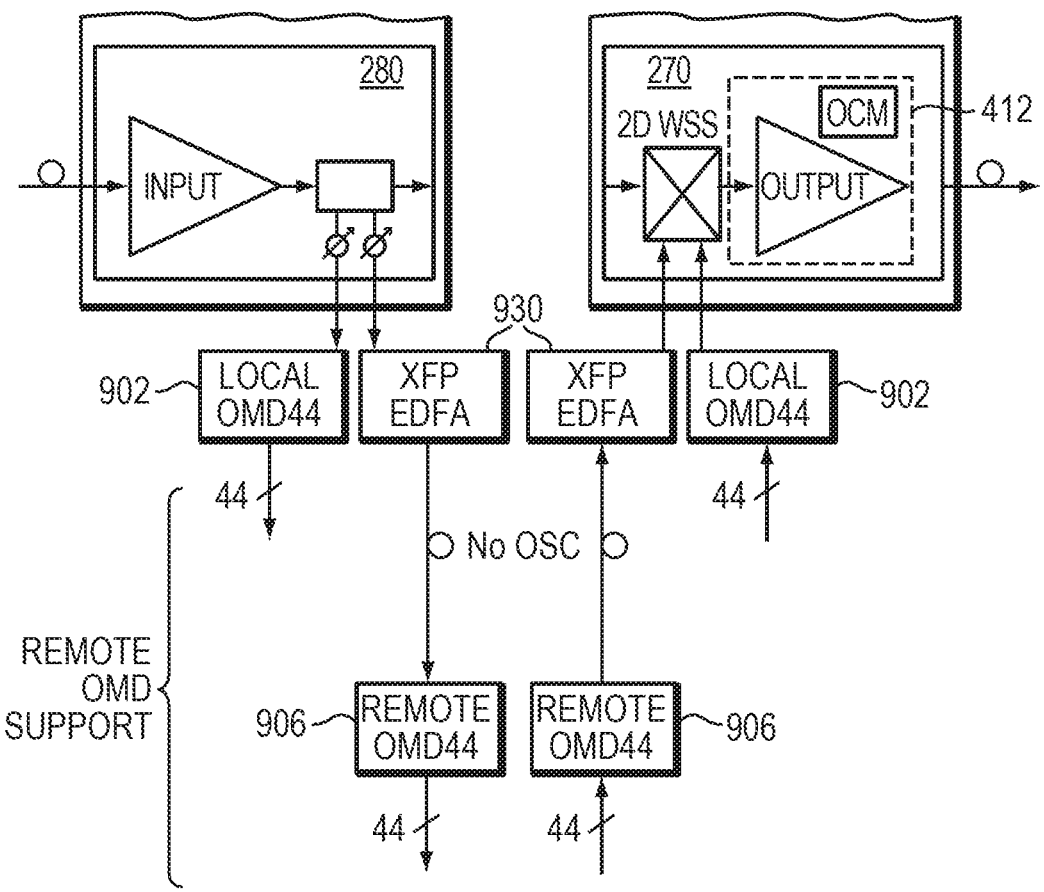
FIG. 9 illustrates another flexible add/drop functionality in accordance with some embodiments.

FIG. 9 illustrates another flexible add/drop functionality in accordance with some embodiments of the system (and method and card) 100 which may include one or more pre-amplifier cards 280, WSS cards 270, and/or erbium-doped fiber amplifiers (EDFAs) 930. FIG. 9 shows support for one or more local OMDs 902 and remote OMDs 906. For example, a near (and/or local) OMD 902 may be connected without a local booster, while a line booster module 412 may be used to amplify optical signals to a further away OMD 906. Also, a pre-amplifier module 280 may be used to amplify signals received from a remote OMD 906.

In FIG. 9, some embodiments may include add/drop for local OMDs 902 and/or remote OMDs 906. Some embodiments may be compatible with a four-degree (4D) and/or eight-degree (8D) auxiliary port architecture. Some embodiments may opt to not include the EDFAs 930. Some embodiments may include EDFA slots in a 2D OADM and/or any used slots in HDTGs which may be in 4D and/or 8D OADM applications. According to some embodiments, no OSC may be associated with the remote OMDs 906. According to some embodiments, no optical-electrical-optical (OEO) regeneration is required. In some embodiments, no traditional FOADM drop/re-add problem exists.

Figure 10:
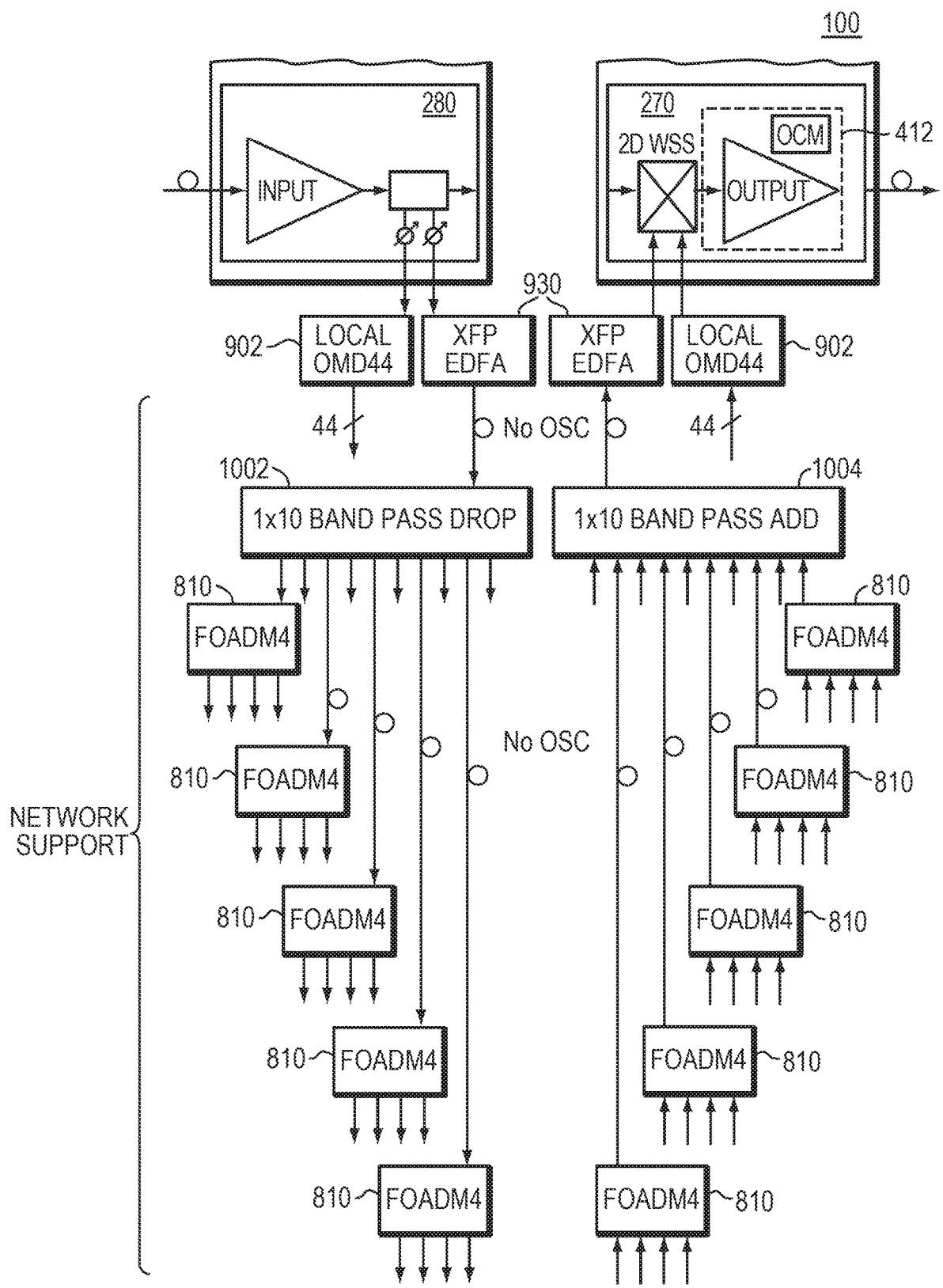
FIG. 10 illustrates yet another flexible add/drop functionality in accordance with some embodiments.

FIG. 10 illustrates another flexible add/drop functionality in accordance with some embodiments of the system (and method and card) 100 which may include one or more pre-amplifier cards 280, WSS cards 270, FOADMs 810, local OMDs 902, a band pass drop 1002, a band pass add 1004, and/or EDFAs 930. FIG. 10 is similar to FIG. 9, but FIG. 10 illustrates multiple OMDs using a local booster module 280 and a pre-amplifier module 412. According to some embodiments, low cost signaling may be provided by the approach of FIG. 10. Although FIG. 10 illustrates that no OSC is provided, some embodiments may include an OSC.

In FIG. 10, some embodiments may include local and/or remote banded drop. Some embodiments may start and/or end on a full node (e.g., 2D or 4D). Some embodiments may include a banded structure that enables low ripple and/or up to 10 directions (or more) of pickup. According to some embodiments, some directions may be re-amplified using EDFAs 930 to provide more remote support. Some embodiments may include an approach that is compatible with 4D and/or 8D port architecture. In some embodiments, EDFAs 930 may be absent. Some embodiments may have no OSC in the banded pickup. Some embodiments may include low cost signaling. Some embodiments do not have a drop/re-add problem.

Figure 11:
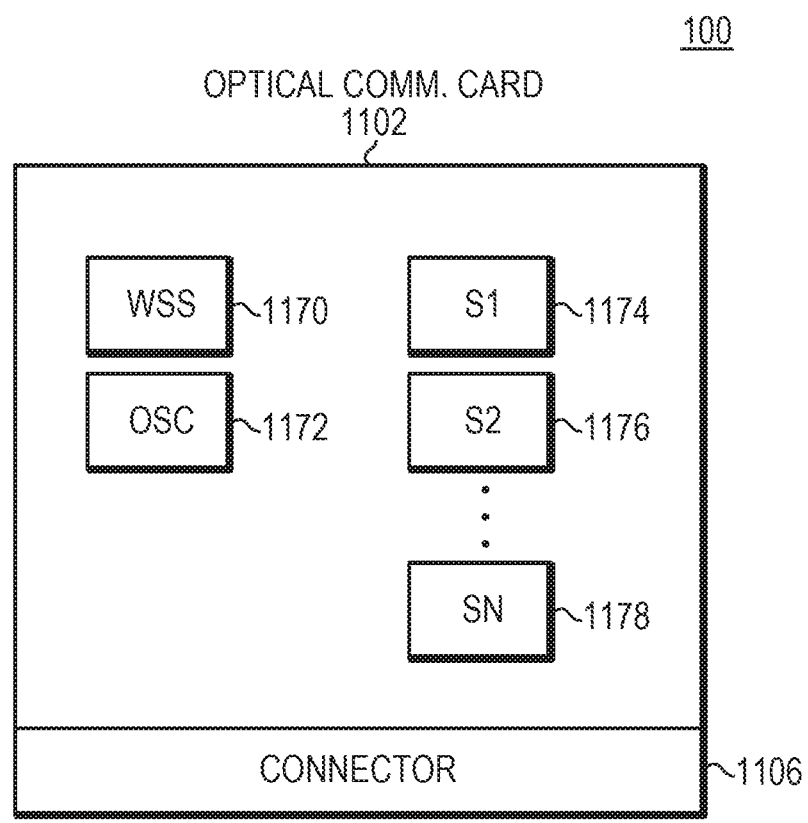
FIG. 11 is an example block diagram illustrating an optical communication card with sockets for receiving communication modules, in accordance with some embodiments.

FIG. 11 is an example block diagram illustrating an optical communication card 1102 with sockets 1174, 1176, 1178 for receiving communication modules, in accordance with some embodiments of the system (and method and card) 100. As can be seen, the optical communications card 1102 may have WSS 1170 and OSC 1172 functionalities with various sockets S1, S2, . . . SN (1174, 1176, . . . 1178, respectively) for receiving modules. The modules may be as described above, and/or other functionalities not described above. The optical communications card 1102 may also have a connector 1106 for plugging into the communication card sockets, such as, for non-limiting example, Socket 1, Socket 2, . . . Socket N (FIG. 2C elements 274, 276, . . . 278, respectively). Although in some embodiments the connector 1106 may be an electrical connection, some embodiments are not so limited. In some embodiments, the connector 1106 may be a combination of electrical and/or optical connectors to use with a corresponding socket (one or more of 1174, 1176, . . . 1178) on the communication card 1102. Furthermore, connections to the modules and between the module and the communication card 1102 may employ any transmission technology known to one skilled in the art, including but not limited to electrical signal transmission and/or optical signal transmission.

Figure 12:
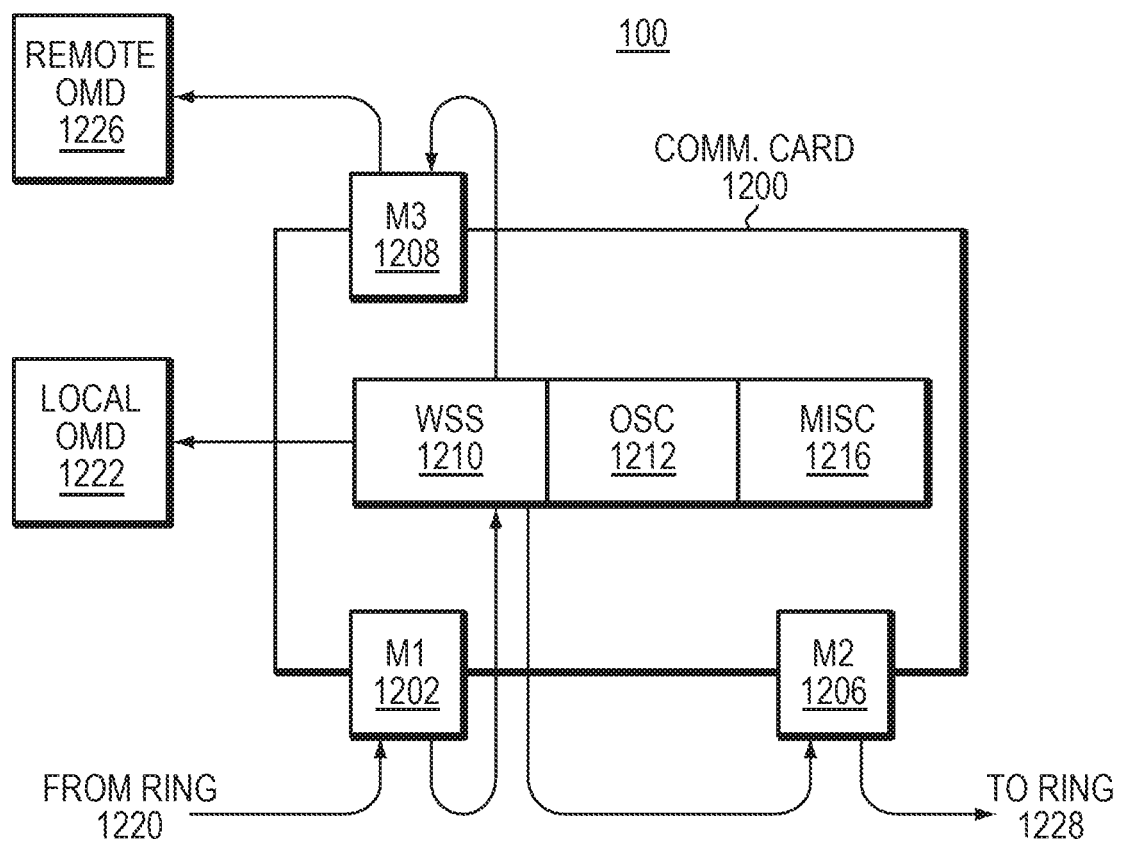
FIG. 12 illustrates an example use of some embodiments.

FIG. 12 illustrates an example use of some embodiments of the system (and method and card) 100. As shown in FIG. 12, the module M1 (1202) may receive optical signals from an optical network 1220 (including but not limited to a point-to-point network, star network, mesh network, tree network, or other type of network). The received signals may be pre-amplified 1202 and then sent to the WSS (1210). The WSS (1210) may select one or more wavelengths to transmit to various ports of the communication card (and/or OADM) 1200. One or more of the wavelengths received by the module M1 (1202) may be transmitted to M2 (1206). Some of the wavelengths may be sent to the local OMD 1222 and some may be sent to the module M3 (1208). According to some embodiments, the module M3 (1208) may provide local boost before transmitting the signals to a remote OMD (1226). According to some embodiments, the module M2 (1206) may provide line boost before transmitting its received signals to the optical network 1228. Some embodiments may also include miscellaneous functionality 1216 on the communication card 1200.

According to some embodiments, an optical supervisory channel (OSC) 1212 may have an additional wavelength that may be outside the erbium-doped fiber amplification (EDFA) amplification band (for non-limiting example, at 1510 nm, 1620 nm, 1310 nm and/or another proprietary wavelength and/or non-proprietary wavelength). The OSC 1212 may carry information about the multi-wavelength optical signal as well as remote conditions at the optical terminal and/or EDFA site. The OSC 1212 may also be used for remote software upgrades and user (i.e., network operator) network management information. According to some embodiments, the OSC 1212 may be a multi-wavelength analogue to synchronous optical network's direct communication channel (SONET's DCC) or supervisory channel. ITU standards suggest that the OSC 1212 may utilize an OC-3 signal structure, though some vendors opt to use 100 megabit Ethernet and/or another signal format. According to some embodiments, unlike the 1550 nm band client signal-carrying wavelengths, the OSC 1212 may be terminated at intermediate amplifier sites, where it receives local information before retransmission.

According to some embodiments, an OMD may receive optical information and/or demultiplex information for a specific user or a set of users. According to some embodiments, a local OMD 1222 may be close enough in distance to an OADM 1200 that it may receive optical signals from the OADM 1200 without the optical signals having to be boosted. A remote OMD 1226 may include an OMD that is too far away to transmit optical signals unboosted. Therefore, a remote OMD 1226 may employ boosting by, for example, a local booster. Optical signals transmitted to, for example, the optical network 1228 may be boosted by a line booster. Optical signals received from, for example, the optical network 1220 may need to be amplified. The amplification of optical signals may be referred to as "pre-amplification."

According to some embodiments, while some figures may be described as having separate local boosters, line boosters, and pre-amplifiers, one amplifier may serve multiple purposes depending on signal strength of input signals, gain needed and/or receiver sensitivity. Accordingly, while the amplifiers may be referred to with different names, the corresponding hardware for the amplifiers may be shared.

According to some embodiments, while descriptions and drawings may have a two-degree (2D) OADM configuration, embodiments are not so limited. Various examples use 2D OADM in an optical network for simplicity of description; however, other usages of some embodiments may allow for higher degrees in a node configuration.

Figure 13:
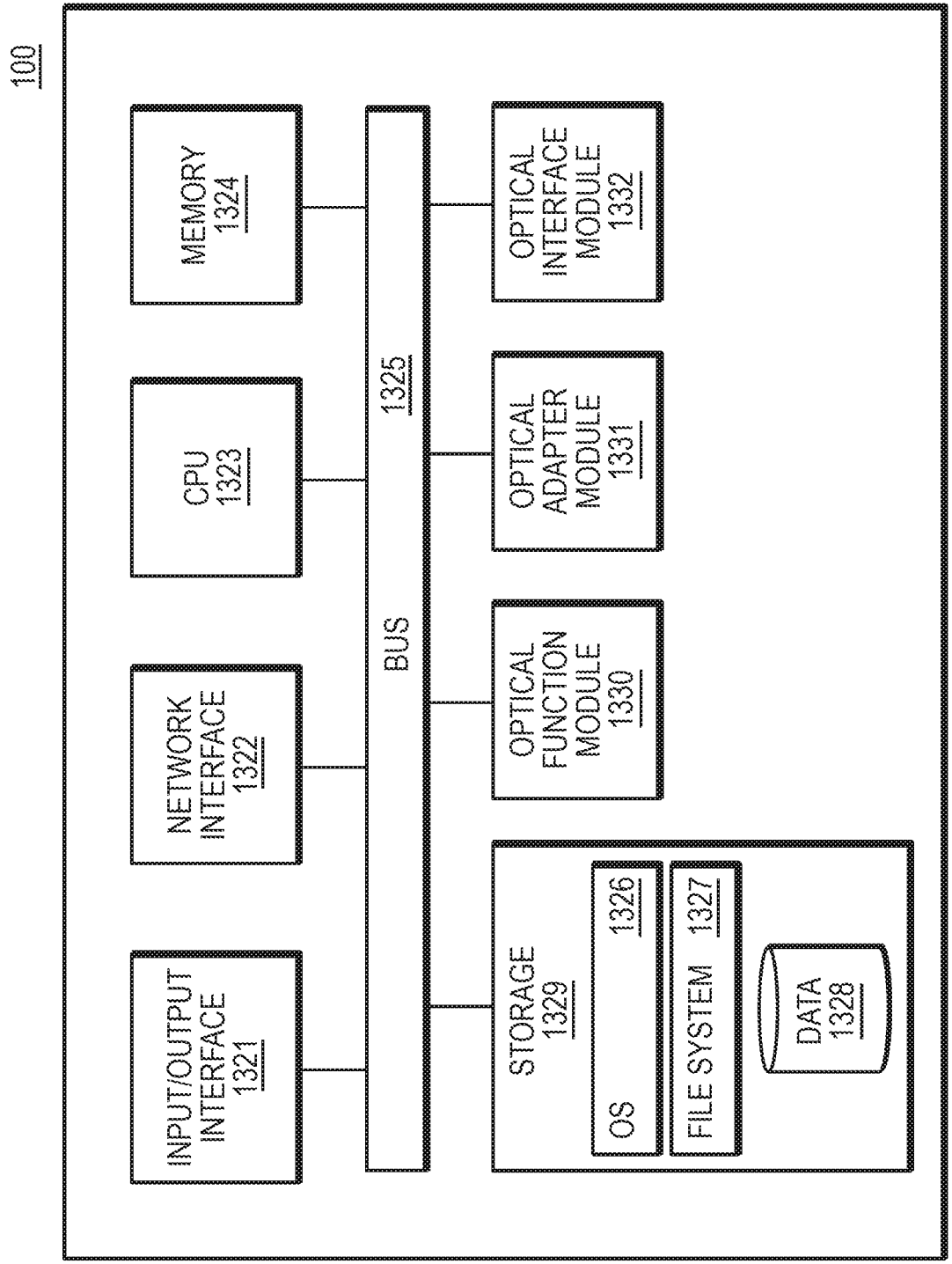
FIG. 13 is a high level block diagram view of an optical computer network environment in which some embodiments may be implemented.

FIG. 13 is a high level block diagram view of a computer network environment in which some embodiments may be implemented. According to some embodiments, FIG. 13 is a high level block diagram of a system 100 that may be configured to learn functions and corresponding specifications from a multi-channel optical function layer, which may include a corresponding optical function module 1330. The system 100 may, through a multi-channel optical adapter layer (which may include a corresponding optical adapter module 1331), configure the multi-channel optical adapter layer itself to interoperate between the multi-channel optical network interface layer (which may include a corresponding optical interface module 1332) and the multi-channel optical function layer (and/or optical function module 1330).

According to some embodiments, the system 100 may comprise a bus 1325. The bus 1325 may be a connection between the various components of the system 100. Connected to the bus 1325 may be an input/output interface 1321 for connecting various input and output devices, such as a keyboard, mouse, display, speakers, etc. to the system 100. Further connected to the bus 1325 may be a network interface 1322 for connecting the system 100 to the various networks that are known in the art. A Central Processing Unit (CPU) 1323 may be connected to the bus 1325 and may provide for the execution of computer instructions. Memory 1324 may provide volatile storage for data used for carrying out computer instructions. Any type of persistent storage 1329 may provide non-volatile storage for software instructions such as the operating system (OS) 1326 and the data 1328. Coupled with the OS 1326, may be the file system 1327. Persistent storage 1329 may be any storage device known in the art.

According to some embodiments, the system 100 may comprise one or more optical function modules 1330. According to an embodiment of the system 100, the function module 1330 may be configured to provide information including but not limited to diagnostic data and/or other data to the optical adapter module 1331. The optical adapter module 1331 may be configured to retrieve information including, but not limited to, diagnostic data, test data, and/or other data from the optical function modules 1330. The retrieved information may be any data as described herein. The optical adapter module 1331 may retrieve the information from any communicatively coupled source. For example, the optical adapter module 1331 may retrieve the information from the storage device 1329 or via the input/output interface 1321 or network interface 1322.

According to some embodiments, communicatively coupled to the optical function module 1330 and/or the optical adapter module 1331 may be the optical interface module 1332. The optical interface module 1332 may be configured to communicate with the adapter module 1331 and/or optical function modules 1330. Communications between these modules 1330, 1331, 1332 may be facilitated from any communicatively coupled source, including, but not limited to, the optical adapter module 1331, the network 1322, from the input/output interface 1321, the memory 1324, or from persistent storage 1329 or other non-transitory computer-readable medium.

According to some embodiments, while the various components of the system 100 are illustrated in FIG. 13, embodiments of the system 100 are not so limited, and, as is known in the art, components and modules of the system 100 may be connected in a variety of ways, including embodiments wherein one or more components are remotely located. It should be understood by a person of ordinary skill in the art that the system 100 may be implemented in various forms. The respective components and modules of the system 100 may be combined in any manner that is known in the art and may be implemented in any combination of hardware and software. For example, the above-described components and modules may be executable instructions in memory 1324 or OS 1326 operated on by CPU 1323. Further, the system 100 and its various components and modules may be configured to operate in a manner corresponding to the above-described method 100, described herein above in relation to FIGS. 1A-D and their various embodiments.

Figure 14:
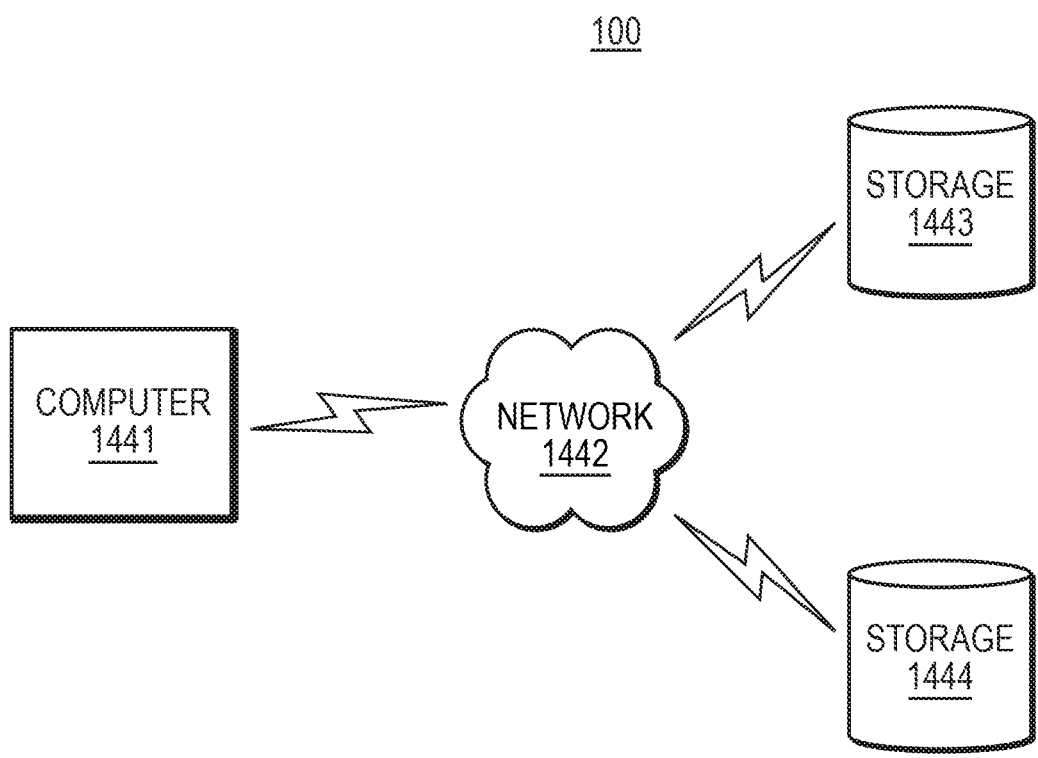
FIG. 14 is a schematic view of an optical computer network environment in which some embodiments may be implemented.

FIG. 14 illustrates another optical computer network environment 1440 in which embodiments of the present invention may be implemented. The computer 1441 and the storage devices 1443 and 1444 are linked through optical network 1442. The computer 1441 and the storage devices 1443 and 1444 may be connected through any optical network as is known in the art, including a fiber-optic network, optical wide area network (WAN), an optical local area network (LAN), free-space optical network, a passive optical network, and/or any other type of optical network. The computer 1441 may embody the system 100 and/or any embodiment of the system 100 described herein. Similarly, the computer 1441 may be configured to carry out any method or embodiment thereof described herein. While only two storage devices 1443 and 1444 are depicted, the computer network environment 1440 may comprise any number of storage devices.

While this disclosure has been particularly shown and described with references to example embodiments thereof, it will be understood by those skilled in the art that various changes in form and details may be made therein without departing from the scope of the disclosure encompassed by the appended claims.

It should be understood that the example embodiments described above may be implemented in many different ways. In some embodiments, the various methods and machines described herein may be implemented by a physical, virtual or hybrid general-purpose computer, or a optical computer network environment such as the optical computer network environments of FIGS. 1-14. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transitory computer readable medium that may be configured to enable a processor to load the software or subsets of instructions thereof. The processor then executes the instructions and may be configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, some embodiments may also be implemented in a variety of computer architectures, physical, virtual, cloud computers, and/or some combination thereof, and, thus, the data processors described herein are intended for purposes of illustration only and not as a limitation of the embodiments.

What is claimed is:

1. A multi-channel optical adapter card system comprising:
  a multi-channel optical adapter card comprising:
   a controller;
   circuitry responsive to the controller;
  at least one plug-in module;
  wherein the multi-channel optical adapter card is configured to receive the plug-in module;
  wherein the controller is configured to:
   retrieve information, from at least one memory device of the plug-in module, to learn at least one function the plug-in module is configured to enable at least in part, and to learn at least one specification corresponding to the at least one function; and modify a configuration of the circuitry based at least in part on the information the controller is configured to retrieve;
wherein the information comprises:
photodiode information; and
at least one of: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, OSC minimum output, OSC maximum output, OSC wavelength, OSC termination, timing synchronization, mid-stage access, line-out presence, spur optimization, port information, insertion loss, start-of-file information, and end-of-file information.

2. The multi-channel optical adapter card system of claim 1, wherein the at least one function is associated with at least one of: amplification, cascading nodes, dispersion compensation, electrically variable optical attenuation (EVOA), erbium-doped fiber amplification (EDFA), erbium-doped optical amplification (EDOA), fixed optical add-drop multiplexing (FOADM), line boosting, local boosting, optical add-drop multiplexing (OADM), optical channel monitoring (OCM), optical combining, optical colorlessness, optical contentionlessness, optical directionlessness, optical colorlessness-directionlessness-contentionlessness (CDC), optical demultiplexing, optical multiplexing, optical multiplexing and demultiplexing (OMD), local optical multiplexing and demultiplexing (local OMD), optical performance monitoring (OPM), remote optical multiplexing and demultiplexing (remote OMD), optical power monitoring, optical protection switching (OPS), optical splitting, optical supervisory channel (OSC) communication, optical time-domain reflectometry (OTDR), multiple channels, multiple degrees, power plane support, pre-boosting, pre-amplification, reconfigurable optical add-drop multiplexing (ROADM), and wavelength selective switching (WS S).

3. The multi-channel optical adapter card system of claim 1, wherein the information includes at least one of: serial number, module type, checksum, inventory code, vendor code, part number, hardware revision level, software revision level, date of manufacture, version number, amplification, amplitude characteristics, phase characteristics, minimum gain, maximum gain, minimum input power, maximum input power, saturation power, number of channels, target output per channel, frequency bands supported, automatic power control (APC) mode, automatic gain control (AGC) mode, minimum tilt, maximum tilt, amplification type, add-drop indication, optical supervisory channel (OSC) information, OSC minimum output, OSC maximum output, OSC wavelength, OSC termination, timing synchronization, mid-stage access, line-out presence, spur optimization, port information, photodiode information, insertion loss, start-of-file information, and end-of-file information.

4. The multi-channel optical adapter card system of claim 1, further comprising:
at least one wavelength selective switch (WSS);
circuitry configured to support communication via an optical supervisory channel (OSC); and
a socket configured to removably receive the plug-in module.

5. The multi-channel optical adapter card system of claim 4, wherein the socket is one of a plurality of sockets the multi-channel optical adapter card comprises, and wherein at least two of the plurality of sockets have a same form factor.

6. The multi-channel optical adapter card system of claim 4, wherein the multi-channel optical adapter card further comprises at least one optical port, and wherein the socket is located on a same side of the multi-channel optical adapter card as is located the at least one optical port of the multi-channel optical adapter card.

7. The multi-channel optical adapter card system of claim 1, wherein the plug-in module is plug and play.

8. The multi-channel optical adapter card system of claim 1, wherein the at least one function is erbium-doped optical amplification.

9. The multi-channel optical adapter card system of claim 1, wherein the at least one function is erbium-doped optical amplification and optical channel monitoring.

* * * * *

UNITED STATES PATENT AND TRADEMARK OFFICE
CERTIFICATE OF CORRECTION

PATENT NO. : 10,972,207 B2
APPLICATION NO. : 15/047363
DATED : April 6, 2021
INVENTOR(S) : Larikova et al.

Page 1 of 1

It is certified that error appears in the above-identified patent and that said Letters Patent is hereby corrected as shown below:

In the Claims

In Claim 2, Column 23, Line 44, delete "switching (WS S)." and insert -- switching (WSS). --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*